United States Patent [19]

Noguchi et al.

[11] 4,257,365

[45] Mar. 24, 1981

[54] TWO-STROKE CYCLE DIESEL ENGINE

[75] Inventors: Masaaki Noguchi, Nagoya; Yukiyasu Tanaka; Isao Igarashi, both of Okazaki, all of Japan

[73] Assignee: Toyota Jidosha Kogyo Kabushiki Kaisha, Toyota, Japan

[21] Appl. No.: 18,025

[22] Filed: Mar. 6, 1979

[30] Foreign Application Priority Data

Oct. 6, 1978 [JP] Japan .................... 53-123728

[51] Int. Cl.³ .................... F02B 25/08; F02D 39/04; F02B 33/22
[52] U.S. Cl. .................... 123/51 B; 123/51 BD; 123/65 A; 123/70 R; 123/73 A; 123/73 S; 123/73 AF
[58] Field of Search ............ 123/51 R, 51 B, 51 BA, 123/51 BD, 29, 69 R, 65 A, 70 R, 73 R, 73 A, 73 AE, 73 AF, 73 CB, 73 CC, 73 S

[56] References Cited

U.S. PATENT DOCUMENTS

| 1,077,956 | 11/1913 | Fox | 123/70 R |
|---|---|---|---|
| 1,077,992 | 11/1913 | McLean | 123/70 R |
| 1,404,551 | 1/1922 | Seymour | 123/73 A |
| 2,347,444 | 4/1944 | Vincent | 123/70 R |
| 2,393,342 | 1/1946 | Schneider | 123/65 A |
| 2,522,649 | 9/1950 | Tenney | 123/70 R |
| 3,687,118 | 8/1972 | Nomura | 123/73 A |
| 4,185,596 | 1/1980 | Noguchi et al. | 123/51 B |

FOREIGN PATENT DOCUMENTS

| 467513 | 6/1914 | France | 123/51 BD |
|---|---|---|---|
| 522427 | 7/1921 | France | 123/73 A |

*Primary Examiner*—Craig R. Feinberg
*Attorney, Agent, or Firm*—Finnegan, Henderson, Farabow, Garrett & Dunner

[57] ABSTRACT

A two-stroke cycle diesel engine having at least one two-stroke cycle power cylinder-piston assembly incorporating uniflow scavenging and having two horizontally opposed pistons, at least first and second scavenging ports and two crankcases which may perform crankcase compression; a pump assembly including at least one scavenging pump cylinder-piston assembly of the reciprocating type which is separate from and is driven by the power cylinder-piston assembly; a scavenging air introducing device which introduces scavenging air compressed by the pump assembly to the first and the second scavenging ports through first and second passage systems, respectively; and a fume generating device incorporated in the second passage system and supplying fuel mist in an initial part of the air supplied through the second passage system; wherein the fume is supplied as stratified with exhaust gases so as to be heated by the exhaust gases toward decomposition and then the first passage system is interrupted before the pump assembly reaches its top dead center so that thereafter the scavenging air compressed by the pump assembly is all supplied to the second scavenging port thereby generating strong swirl flows in the power cylinder.

22 Claims, 38 Drawing Figures

FIG. I

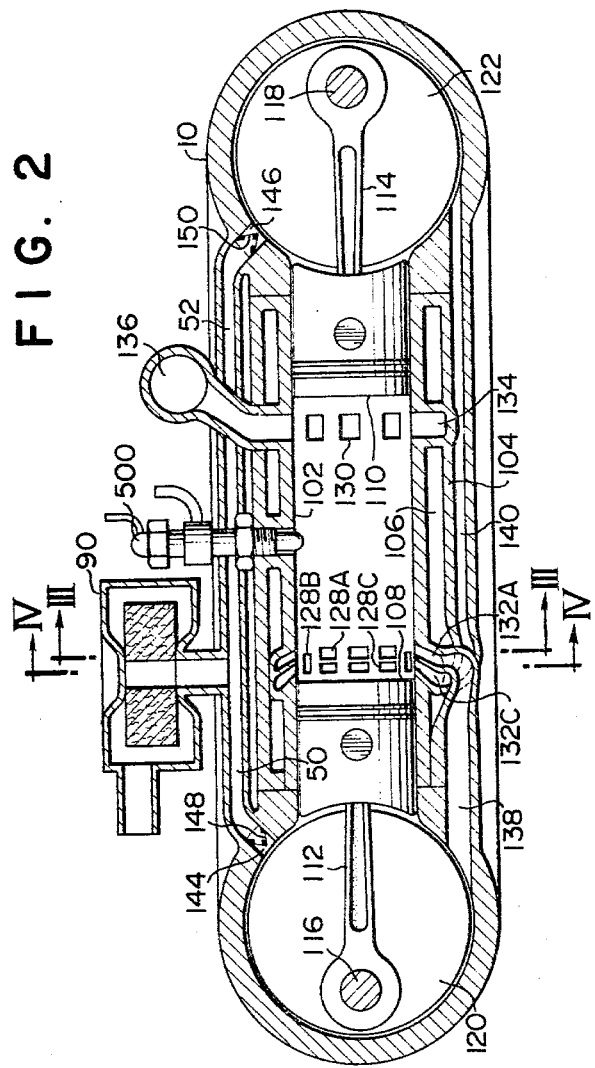
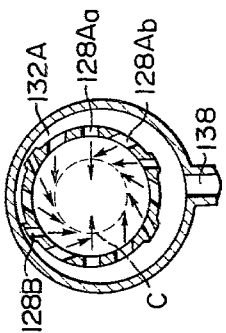
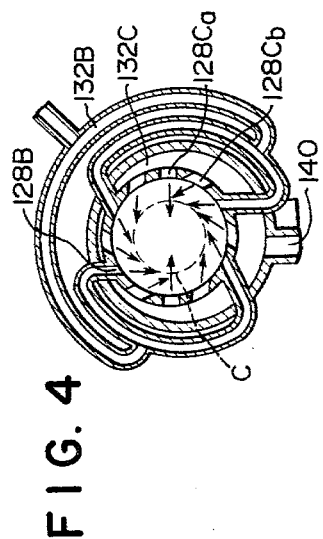
FIG. 2
FIG. 3
FIG. 4

FIG. 7
FIG. 8
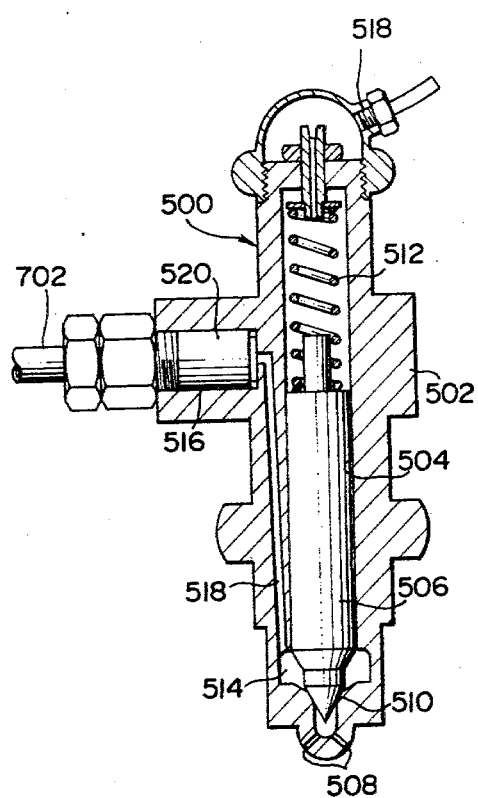
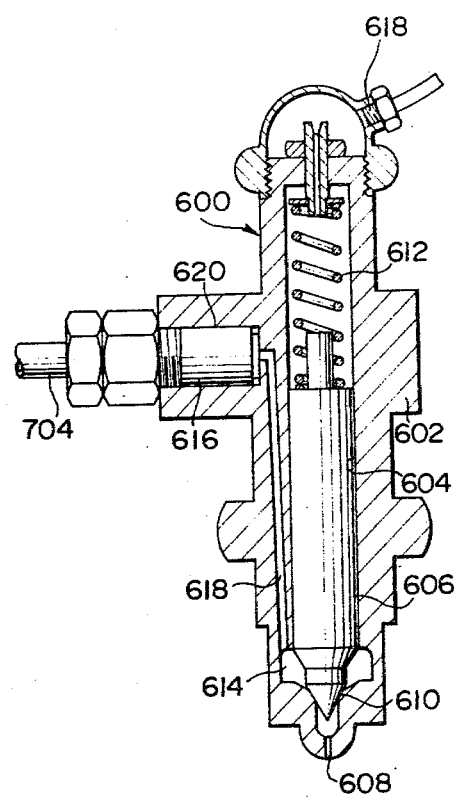

FIG. 9
FIG. 10
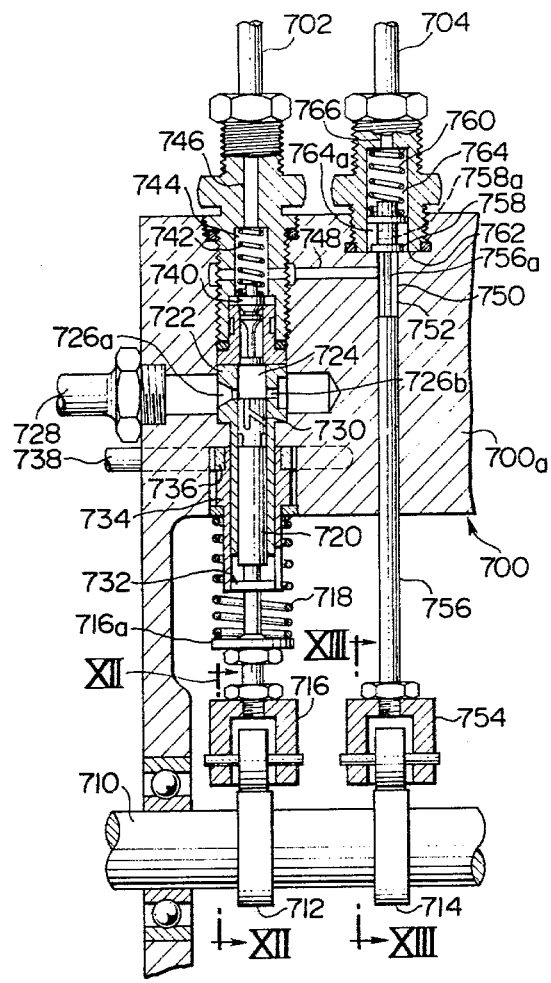
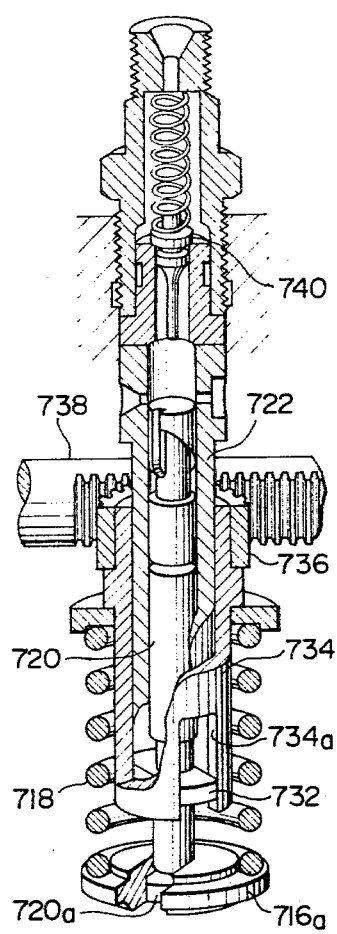
FIG. 11
(a)  (b)  (c)  (d)  (e)
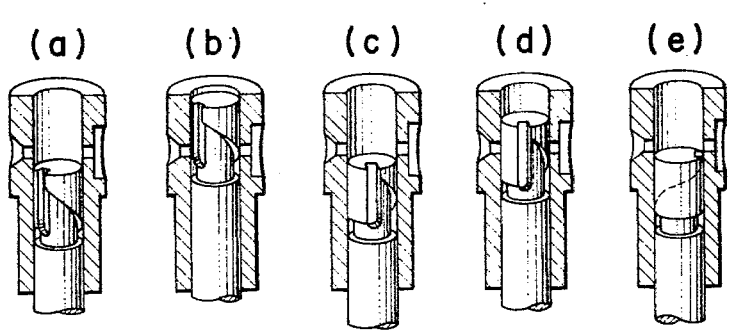

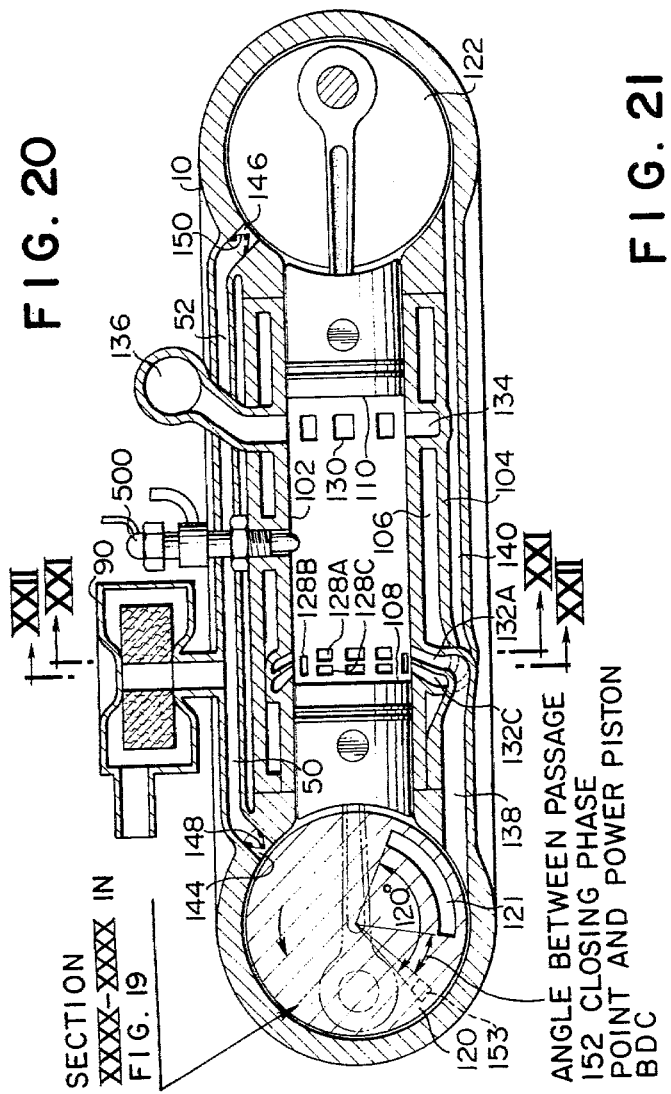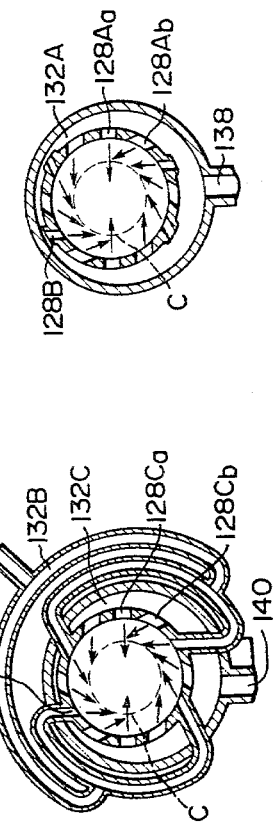

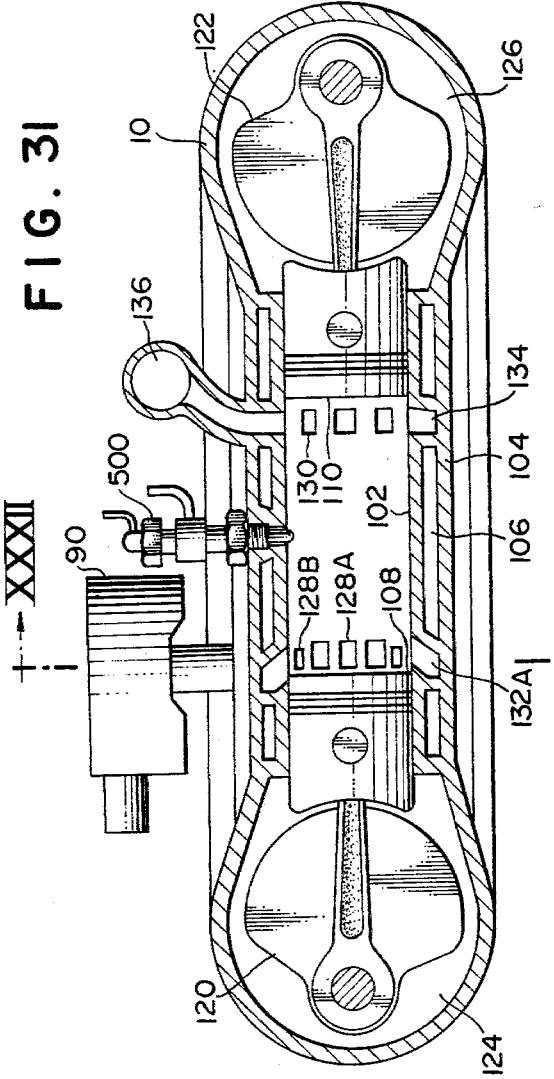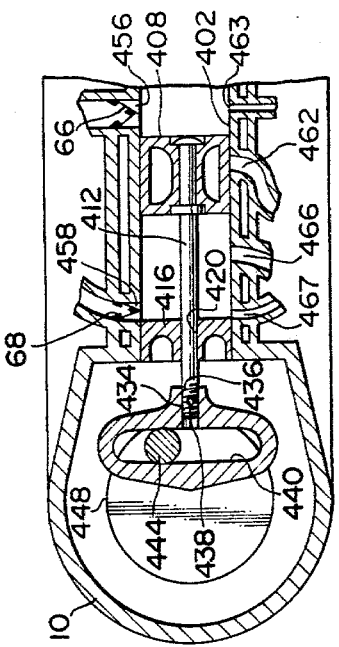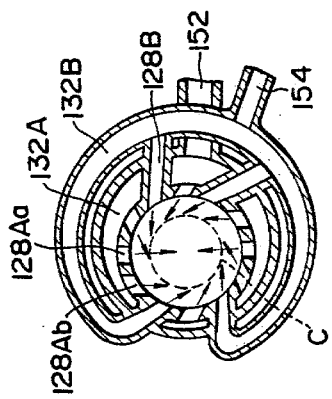

TWO-STROKE CYCLE DIESEL ENGINE

BACKGROUND OF THE INVENTION

The present invention relates to a two-stroke cycle diesel engine, and, more particularly, to a two-stroke cycle diesel engine adapted for use as a small-size automobile engine.

A two-stroke cycle engine has theoretically the advantage that an engine of a certain size can generate a greater power than a four-stroke cycle engine of an equivalent size because the two-stroke cycle engine has twice as many work cycles per revolution as the four-stroke cycle engine. However, with regard to conventional small-size diesel engines, in practice, power output per unit effective stroke volume of a two-stroke cycle engine is not substantially different from that of a four-stroke cycle engine. This is due to the fact that scavenging is insufficient in small-size two-stroke cycle diesel engines and power output per unit effective volume per combustion stroke is very low. In fact, a volumetric efficiency as high as 80% is available in four-stroke cycle engines, while on the other hand the volumetric efficiency of the typical two-stroke cycle engine is still as low as 40–50%. Conventional small-size two-stroke cycle diesel engines mostly depend upon crankcase compression for the compression of scavenging air. However, since the pump stroke volume of crankcase compression is equal to the stroke volume of the engine, and since the crankcase has a relatively large clearance volume, the compression ratio of crankcase compression is relatively low, so that as a result the amount of air drawn into the crankcase is small, the amount of delivered air is small, the delivery pressure is low and hence the scavenging pressure is low. Consequently it is hard to supply a really adequate amount of scavenging air into the power cylinder. As a result, the delivery ratio obtained in an engine wherein scavenging is effected only by the normal crankcase compression is only as high as 0.5–0.8. Since the trapping efficiency is about 0.7, the volumetric efficiency becomes as low as 40–50%, as mentioned above.

The purpose of scavenging is to push the residual exhaust gases in the power cylinder out of it by fresh air. If the pressure of the residual exhaust gases and the distance between the scavenging port and the exhaust port are given, the time required for completing scavenging is determined by the pressure and the amount of scavenging mixture or air, provided that stratified scavenging is performed, wherein the amount of scavenging mixture or air determines how strongly the initial supply of scavenging mixture or air is backed up. Now, if the scavenging pressure is low, as when crankcase compression is used, a relatively long time is required for completing scavenging, particularly when the scavenging is performed by uniflow scavenging. When the engine is rotating at high speed, therefore, it may well occur that the exhaust port is closed before the scavenging is completed, so that a large amount of exhaust gases still remains in the power cylinder. In such situation only a very small amount of fresh air is charged into the power cylinder. Therefore, conventional two-stroke cycle engines have been unable to operate satisfactorily in the high-speed range.

Furthermore, when scavenging depends only upon crankcase compression, since a power piston also operates as a pump piston, as a matter of course, the operational phase difference between a power cylinder-piston assembly and a pump cylinder-piston assembly is exactly 180°. Therefore, the pump piston of a pump cylinder-piston assembly just reaches its top dead center (TDC) when the power piston of a power cylinder-piston assembly reaches its bottom dead center (BDC). In this connection, in the present description, the TDC of a piston means the dead center of the piston at the end of the compression stroke of the piston, while the BDC of a piston means the dead center of the piston at the end of the suction or expansion stroke of the piston. In this case, however, although a half of the scavenging period is still left in the power cylinder-piston assembly when its power piston has reached its BDC, the pump piston now begins to move towards its BDC, whereby the pressure in the crankcase rapidly lowers after the power piston traverses its BDC, so far as to generate a partial vacuum in the crankcase, thereby causing the problem that the scavenging period is not all effectively utilized.

In view of the aforementioned problem of poor engine performance due to insufficient scavenging as mentioned above, we have proposed, in U.S. Pat. No. 4,185,596 and pending U.S. patent application Ser. No. 917,244, to improve the performance of two-stroke cycle gasoline engines by assisting or by replacing the conventional scavenging dependent only upon crankcase compression by scavenging dependent upon a reciprocating type pump cylinder-piston assembly which is separate from and is driven by the power cylinder-piston assembly in synchronization therewith. This substantially increases the pressure and the amount of scavenging mixture when compared with the conventional scavenging dependent only upon crankcase compression. By combining such a concept of scavenging by substantially increased pressure and amount of scavenging mixture with a power cylinder-piston assembly incorporating uniflow scavenging, volumetric efficiency of the power cylinder-piston assembly is substantially increased. To improve further the performance of such a two-stroke cycle gasoline engine, shifting the operational phase of the separate pump cylinder-piston assembly relative to that of the power cylinder-piston assembly so that the top dead center of the pump cylinder-piston assembly is behind the bottom dead center of the power cylinder-piston assembly by a certain phase angle provides an extension of scavenging period after the BDC of the power cylinder-piston assembly, so that the volumetric efficiency of scavenging of the power cylinder-piston assembly is further increased.

Further, we have proposed, in a pending U.S. patent application Ser. No. 966,597, a two-stroke cycle diesel engine employing a pump cylinder-piston assembly which separate from and is driven by the power cylinder-piston assembly in synchronization therewith, in addition to or instead of the conventional crankcase compression, for substantially increasing the pressure and the amount of scavenging mixture when compared with the conventional scavenging dependent only upon crankcase compression. Supplying scavenging air into the power cylinder in a relatively slowly swirling condition so that as highly stratified a condition as possible should be maintained in the power cylinder suppresses mixing between the exhaust gases and the scavenging air during the primary scavenging process of expelling exhaust gases out of the power cylinder. Then, by generating strong swirl flow in the power cylinder depending upon high pressure and large amount of scavenging air, the danger of substantially lowering the trapping efficiency due to mixing between the exhaust gases and the scavenging air is eliminated, thereby shortening delay of ignition of fuel and increasing combustion speed of fuel. The engine, therefore, operates at high volumetric efficiency with high power output without causing diesel knock or smoking.

The abovementioned particular combination of scavenging by substantially increased pressure and amount of scavenging mixture available from a separate pump cylinder-piston assembly and the uniflow scavenging of a power cylinder-piston assembly depends upon the idea, confirmed by experiments, that it is possible to push the exhaust gases existing in the power cylinder uniformly out of it by the scavenging mixture at high pressure without causing any detrimental mixing between the scavenging mixture and the exhaust gases if uniflow scavenging is employed. In this case, if the amount of scavenging mixture is increased so as to be necessary and sufficient, and if the duration of scavenging is long enough, scavenging at high scavenging efficiency is accomplished, and, as a result, the volumetric efficiency increases, resulting in corresponding increase of engine output power. By contrast, if cross or loop scavenging is used, the flow of scavenging mixture at increased pressure is liable to penetrate through the layer of exhaust gases existing in the power cylinder in a short-cutting manner, and scavenging mixture and exhaust gases may be mixed with each other, not only causing poor scavenging but also increasing blow-out loss of mixture, and lowering the volumetric efficiency.

Further, in the applications it has been proposed that the two-stroke cycle gasoline engine incorporating uniflow scavenging should have a two-stroke cycle power cylinder-piston assembly having two horizontally opposed pistons. This is related with the fact that the engine is particularly intended for use with automobiles. As described in detail in the specifications of the aforementioned former applications, currently there exists a great demand for the development of cars which have low fuel consumption, in view of energy saving. Cars also must satisfy a high standard with regard to the prevention of air pollution. In order to improve fuel consumption, not only improvement of the fuel consumption of the engine itself but also reduction of the air resistance of the vehicle are required.

We have noted, in connection with various running tests carried out to prepare for the qualification tests for conforming to the standard for the prevention of air pollution (which are becoming more severe), that fuel consumption is different in summer and in winter due to the difference of atmospheric air density, and we more keenly recognized that the air resistance of the vehicle has an important effect on the fuel consumption of the vehicle even in low speed running. In order to lower the air resistance of the vehicle, it is important to reduce the height of the vehicle as much as possible and to form the vehicle in a streamlined external shape. Particularly, it is very effective to lower the engine hood. In order to reduce the height of the vehicle it is effective to eliminate the driving shaft for driving the rear wheels so that the shaft tunnel is eliminated and the entire floor may be flat, thereby constructing a vehicle body having a low floor and a low roof. A method for accomplishing this is to employ the FF system, i.e. the front engine-front drive system. In order to lower the engine hood by a large amount in an automobile of the FF type while ensuring necessary legroom for the driver and the front seat passenger, it is necessary to reduce substantially the height and length of the entire engine compartment. Furthermore, in order to reduce the air resistance of the vehicle, it goes without saying that the frontal area of the vehicle must be reduced. Therefore the width of the vehicle should be minimized. Furthermore, since the transmission, differential gears, and other driving mechanisms must be housed in the engine compartment together with the engine, in the FF system, the space allowed for the engine is much reduced. Light trucks are often designed with the engine mounted under the driver's seat, and in such a design the engine, being relatively long, often extends so far backwards as to make a hump due to the engine enclosure rearward of the cabin, thus shortening the deck. Depending upon the recognition of these facts, the desire for obtaining an engine which is low in its height, short in its length, and yet not very large in its width, and which has relatively high output power when compared with its volume was combined with the idea of substantially increasing pressure and volume of scavenging mixture or air in a two-stroke engine incorporating uniflow scavenging so as to increase substantially the performance of the two-stroke cycle engine, resulting in the choice of a two-stroke cycle power piston assembly having two horizontally opposed pistons and incorporating uniflow scavenging.

In the aforementioned pending U.S. patent application Ser. No. 966,597, it is intended, by using a pump cylinder-piston assembly separate from a power cylinder-piston assembly, to increase substantially the volumetric efficiency in scavenging of a two-stroke cycle diesel engine. This is accomplished by not only increasing the power output of the engine, but also generating strong swirl flow of scavenging air directly in the power cylinder without causing reduction of scavenging efficiency due to mixing of the scavenging air and the exhaust gases, thereby expediting ignition and combustion of fuel so as to avoid the occurrence of diesel knock and/or smoking. With regard to the concept of giving strong swirl to the air introduced into the power cylinder, it is conventionally known to provide a vortex chamber at a part of the engine cylinder of a small-size high speed diesel engine for automobiles so as to produce strong swirl flow in the vortex chamber by the flow of air which flows from the main part of the engine cylinder into the vortex chamber. The fuel is injected into the vortex chamber. In this vortex chamber type engine stronger swirl flow is obtained in the vortex chamber as the rotational speed of the engine increases, with the air being more strongly driven into the vortex chamber. However, in this type of engine having a vortex chamber, or, in general, in an engine having an auxiliary combustion chamber, there is a drawback in that loss of effective energy due to throttling loss and vortex loss as well as heat loss due to increase of the cooling surface of the combustion chamber caused by an auxiliary chamber are relatively large, thereby resulting in increase of fuel consumption and reduction of the mean effective pressure. Therefore, it is intended in the present invention, as was so intended in the former proposition, to employ an engine of a direct fuel injection type which does not employ any auxiliary chamber, and, instead of this, to increase substantially the volumetric efficiency in scavenging as well as to generate strong swirl flow of scavenging air required for proper combustion of fuel. In this connection, it is relatively simple to generate a strong swirl flow of air in the power cylinder, without employing any vortex chamber, by employing a pump cylinder-piston assembly separate from a power cylinder-piston assembly so that the pressure and the amount of scavenging air are substantially increased when compared with scavenging only by conventional crankcase compression and by incorporating a proper air deflecting structure in the scavenging port. However, if such a strong swirl is given to the scavenging air from the beginning of its introduction into the power cylinder, great mixing between the scavenging air and the exhaust gases in the power cylinder is caused, even though there is no danger of causing the blow-out loss of fuel as in the case of a gasoline engine since only air is used for scavenging in a diesel engine. Thus there occurs the problem that the trapping efficiency is substantially lowered. In view of this problem, in the aforementioned pending U.S. patent application Ser. No. 966,597, we have proposed a special device which is to supply scavenging air as a moderately swirling flow in the initial stages of scavenging so as to avoid mixing of the scavenging air and the exhaust gases. Then, after the scavenging has proceeded so far as to eliminate the danger of causing a substantial reduction of the trapping efficiency due to mixing between the scavenging air and the exhaust gases, scavenging air with strong swirl is supplied, so as finally to generate a strong swirl flow of scavenging air in the power cylinder which is required for desirable ignition and combustion of fuel. Although this swirl flow of scavenging air is somewhat attenuated during the subsequent compression stroke, a substantial part of the swirl still remains after the completion of the compression stroke, supplying fresh air around atomized particles of fuel, thereby expediting ignition and combustion of the fuel. When this particular scavenging structure is combined with the scavenging by high pressure and large amount of scavenging air available from a pump cylinder-piston assembly separate from the power cylinder-piston assembly, the power cylinder-piston assembly is scavenged at high volumetric efficiency and in such a way that the scavenging air is given stronger swirl as the rotational speed of the engine increases. Such a swirl of scavenging air is effectively preserved until the final stage of compression so that the fuel injected directly into the power cylinder is quickly and desirably dispersed in the swirl of air thereby effecting quick ignition and combustion of fuel and enabling the diesel engine to operate at high speed.

However, it is to be noted that the abovementioned high speed operation with regard to the two-stroke cycle diesel engine of the aforementioned prior application is located in a lower speed region than the high rotational speed region of conventional automobile four-stroke cycle gasoline or diesel engines, and is about 3800 rpm at the highest. This aims at reduction of internal friction losses in the engine and at increase of effective output power of the engine. Conventionally, a relatively small-sized four-stroke cycle engine for automobiles is designed so as to be operated at relatively high rotational speed so that relatively high power output is available from a relatively small-sized engine. In this connection, it is noted that, for example, in the case of an engine which has a two-liter piston displacement and produces 92 PS of brake horsepower at 5000 rpm, a very large proportion of the power, such as 52 PS out of the indicated horsepower of 144 PS, is consumed by internal friction losses in the engine. The ratio of the internal friction losses to the output power of the engine is substantially reduced by lowering the rotational speed of the engine. In view of this, and in view of the fact that a two-stroke cycle engine can generate higher power than a four-stroke cycle engine at lower rotational speed if its volumetric efficiency is increased, since the feature that a two-stroke cycle engine has twice as many work cycles per revolution as a four-stroke cycle engine, the invention of the aforementioned prior application contemplates effective utilization of this feature by increasing the volumetric efficiency of a power cylinder. This is accomplished by the combination of scavenging by high pressure and volume of scavenging air and uniflow scavenging, and, to increase power output, by giving high swirl to scavenging air in accordance with the rotational speed of the engine. Thus, the rotational speed of the engine may be lower than conventional small-size four-stroke cycle automobile engines, while the net output power per unit stroke volume of the engine may be increased. In this connection, from the point of view of effecting good scavenging of the area next to the piston head, it is desirable that the piston head should have a nearly planar surface. However, from another point of view of obtaining a squashing effect of combustion air in the final stage of compression stroke, it is also desirable that a cavity should be formed in the piston head so as to add a swirl flow around an axis perpendicular to the axis of the main swirl flow which rotates around the central axis of the power cylinder, thereby generating complex swirls which further expedite ignition and combustion of fuel.

On the other hand, it has been the problem for years in diesel engines to suppress diesel knock and smoking, and this problem is even more serious when a diesel engine is employed as an automobile engine. In the aforementioned prior application with regard to a diesel engine, we contemplated solving this problem by giving strong swirl, in a particular manner, to the scavenging air introduced into the power cylinder.

Rudolf Diesel, the inventor of the diesel engine, states in the specification of his basic patent that in the diesel engine fuel must be supplied gradually over a certain time period. However, in accordance with modern research with regard to diesel engines, it has been found to be effective for the suppression of diesel knock and smoking, supplying a small amount of fuel as a pilot charge, and then, after the lapse of a distinct time interval, supplying a main charge of fuel, rather than supplying fuel gradually, is more effective. This is due to the fact that when a pilot charge of fuel is supplied in advance of the supply of the main charge of fuel by a certain time, the fuel of the pilot charge is already in combustion at the time the main charge of fuel is supplied. This avoids abrupt combustion of all the fuel together at one time after the lapse of a combustion delay time, which is diesel knock in conventional diesel engines. Up to now this pilot charge method has been considered to be most effective for suppressing diesel knock and smoking. However, this method requires provision of a first fuel injection system which supplies a predetermined amount of pilot charge of fuel regardless of engine load and a second fuel injection system which supplies a main charge of fuel the amount of which varies in accordance with engine load.

Another method of suppressing diesel knock and smoking is known "fumigation". In this method, a small amount of fuel is sprayed into scavenging air which does not unergo ignition by compression, i.e. pre-ignition, of the fuel/air mixture during compression stroke.

The fuel thus pre-sprayed into the scavenging air is decomposed, without igniting, by heat applied during compression stroke, so as to generate chemically active radicals such as C2, CH, CHO, OOH, H, OH, which expedite initiation of combustion of fuel. However, in order to obtain good results from this fumigation with regard to suppression of diesel knock and smoking, the fuel sprayed into the air introduced into the power cylinder during suction stroke must have the form of very fine particles, or the fuel should be vaporised. According to all test results available to us, in order to obtain good results from fumigation of spraying type, it is required that the sprayed fuel particles should have mean diameter of about 4 microns. Therefore, a diesel engine which employs this conventional fumigation requires a fine fuel particle generating means, which is generally a high pressure apparatus, for convenient fuel spraying, as well as a large scale heating means for heating air including fuel particles (this is called fume) so as to vaporize these fuel particles before the air is introduced into the power cylinder. If a convenient fuel spraying means such as a conventional carburetor or fuel injection means alone is used without a fume heating means, the fuel particles will be too large to suppress effectively diesel knocking or smoking.

SUMMARY OF THE INVENTION

In the present invention, we combine the concept of suppressing diesel knock and smoking obtained by the particular scavenging system incorporated in the diesel engine in accordance with the aforementioned prior U.S. patent application Ser. No. 966,597, with the concept of fumigation so as to obtain a synergistic effect of more effectively suppressing diesel knock and smoking by a simpler and less expensive fume generating means. This provides an improved high performance two-stroke cycle diesel engine having high volumetric efficiency and high power output.

As mentioned above, in the two-stroke cycle diesel engine proposed in the aforementioned prior U.S. patent application Ser. No. 966,597, it is intended to scavenge the power cylinder by maintaining scavenging air and exhaust gases in a stratified condition in an initial stage of scavenging where there is a danger of causing great mixing between the scavenging air and the exhaust gases by supplying the scavenging air with a relatively moderate swirl so that the scavenging air and the exhaust gases are not mixed with each other at their boundary region. In this case, due to the fact that uniflow scavenging is performed in a power cylinder-piston assembly having two horizontally opposed pistons, and due to the fact that the engine is adapted to operate at a relatively low rotational speed depending upon substantially increased scavenging efficiency, the time which elapses while the boundary between the scavenging air and the exhaust gases preserved in a stratified condition travels from the scavenging port to the exhaust port is substantially long. The present invention utilizes this feature to perform effective fumigation.

In more detail, in accordance with the present invention, fuel particles for fumigation are provided in a portion of the scavenging air which is located adjacent to the exhaust gases preserved in a stratified condition, so that the fuel particles are heated by the mass of hot exhaust gases so as to be reduced to smaller particles, vaporized, and finally decomposed, particularly under application of heating by the exhaust gases as well as heating by adiabatic compression, so as to generate chemically active radicals such as C2, CH, CHO, OOH, H, OH. In this case, the reduction of diameter, vaporization, and decomposition of fuel particles for fumigation are effectively performed by the condition that the mass of exhaust gases is maintained at a temperature high enough to perform these functions since it is preserved in a stratified condition relative to cold scavenging air without great mixing therebetween which would reduce the temperature of the exhaust gases, and that a relatively long time is available to perform these functions. In this case, the heating of the fumigation fuel by the mass of exhaust gases terminates as the scavenging stroke reaches towards its end. However, subsequent to this, heating of the fumigation fuel further proceeds by adiabatic compression due to the subsequent compression stroke, so that finally the fumigation fuel reaches a critical temperature at which the fuel is rapidly decomposed to generate the aforementioned radicals. Therefore, when the main charge of fuel is injected into the scavenging air including such radicals nearly at the end of the compression stroke, the fuel of the main charge is rapidly ignited and combusted by the help of the radicals, so as to avoid diesel knocking and smoking.

In order that the fumigation fuel particles are effectively heated toward decomposition by the mass of exhaust gases, it is required that the air which includes the fumigation fuel particles, i.e. the layer of fume, should be located as close to the layer of exhaust gases as possible. However, in order to accomplish perfect scavenging of the power cylinder so as to obtain the maximum volumetric efficiency, it is unavoidable that in scavenging, a part of scavenging air which is in contact with the layer of exhaust gases is blown out through the exhaust ports together with the exhaust gases. In view of this, it is desirable that the part of scavenging air which is in contact with the layer of exhaust gases should be merely air, i.e. should not include any fumigation fuel particles. Therefore, it is desirable that the fuming layer which consists of air including fumigation fuel particles should be provided close to the layer of exhaust gases with interposition of a thin air layer positioned therebetween. In this case, it might be feared that the intermediate air layer would prevent heat transmission from the mass of exhaust gases to the layer of fume, since an air layer is a heat insulating layer. However, in fact, the scavenging air is moderately swirling as described above so as to perform a shearing action at the border of the two layers of scavenging air and exhaust gases, thereby generating small turbulences in the boundary region, which operate to transfer heat from the layer of exhaust gases to the layer of fume by convection. Therefore, the thin intermediate layer of air operates as a convection heat transfer layer acting between the two layers of exhaust gases and fume, until it is finally exhausted through the exhaust port together with the exhaust gases at the end of scavenging stroke so as to provide complete scavenging of the power cylinder.

The abovementioned fume layer is formed by employing a proper fuel injection means and by supplying fuel particles into the flow of scavenging air which is introduced into the power cylinder with moderate swirling so as to perform stratified scavenging of exhaust gases. Therefore the concept of the present invention can be practiced by adding an additional fuel injection means to the engine proposed in the aforementioned U.S. Patent application Ser. No. 966,597. The additional fuel injection means is adapted to supply fuel particles to the air supplied to the power cylinder in the stage of performing stratified scavenging of the power cylinder. Further, in this case, the additional fuel injection means need not atomize fuel into very fine particles. The fumigation fuel which proceeds through stages of being heated by the mass of exhaust gases in scavenging stroke and of being heated further by adiabatic compression of scavenging air so as finally to be decomposed to chemically active radicals is such fuel only which is positioned relatively close to the mass of exhaust gases from the beginning of the scavenging period until the end of the scavenging period. Therefore, the injection of fuel for forming effective fume need only be performed for a very limited period in the initial stage of scavenging stroke, and the amount of fuel injected for fumigation need only be very small. Further, since the pressure of scavenging air in scavenging stroke is relatively low, and since the fuel particles for fumigation need not be so finely atomized, the pressure of fuel ejected from the fuming fuel injection device may be relatively low. Therefore, a fuel injection device of a relatively simple structure and less expensive type may be used as the fuming fuel injection device.

If the inside of the power cylinder of the engine in accordance with the present invention were observed during its operation, one would observe as follows: in the first half of the scavenging stroke there exist as arranged from the exhaust port toward the scavenging port a layer of exhaust gases, a thin layer of air, a layer of fume, and a main layer of air. The thin air layer, the fume layer, and the main air layer are moderately swirling as a whole. However, the thin air layer is somewhat turbulent due to shearing action effected between the thin air layer and the layer of exhaust gases. If the fume layer is relatively thick, the rearward portion thereof as seen from the side of the exhaust gases remains not-decomposed due to lack of heating. From this condition, the scavenging process proceeds, and when the border between the exhaust gas layer and the scavenging air layer has approached the exhaust port, the scavenging air introduced into the power cylinder through the scavenging port is given a strong swirl, the swirling energy being gradually transmitted from the rear end towards the front end of this main air layer. Thus the layer of scavenging air is put into strong swirling, with the swirl strongest at the rear end of the layer of air and the swirl being of less and less degree towards its forward end where it contacts the layer of exhaust gases.

When the layer of exhaust gases is completely exhausted from the power cylinder, the air which forms the thin air layer located between the exhaust gas layer and the fume layer is also entrained by the flow of exhaust gases and is exhausted out of the power cylinder, thereby leaving the fume layer to be the front border of the layers which are preserved in the power cylinder when the exhaust port is closed and the subsequent compression stroke is started. The swirl motion of scavenging air is preserved at a substantially strong level until the end of the compression stroke. On the other hand, the fuel particles contained in the fume layer are strongly heated by the mass of exhaust gases by way of the thin air layer while they travel from the outlet of the scavenging port to the front side of the exhaust port. Thus the fuel particles are reduced in size with substantial vaporization of the fuel, and when these heated small fuel particles and vaporized fuel molecules are further heated up to a certain critical temperature by adiabatic compression of the scavenging air in the subsequent compression stroke, the fuel is rapidly decomposed so as to generate a large amount of radicals. By the time the main charge of fuel is injected into the power cylinder nearly at the end of the compression stroke, this decomposition of fuel has proceeded so far as to produce enough radicals to effectively expedite ignition and combustion of the fuel supplied as the main injection of fuel. Thus, the fuel of the main injection is introduced into high temperature swirling air including a large amount of radicals, and this fuel is immediately ignited and combusts under desirable conditions, so that the subsequent combustion stroke is performed without causing diesel knock or smoking.

BRIEF DESCRIPTION OF THE DRAWING

The present invention will become more fully understood from the detailed description given hereinbelow and the accompanying drawings, which are given by way of illustration only, and are therefore not limitative of the present invention, and wherein:

FIG. 2 is a sectional view along line II—II in FIG. 1;

FIGS. 3 and 4 are sectional views along lines III—III and IV—IV in FIG. 2;

FIG. 7 is a vertical sectional view in somewhat diagrammatical illustration of an embodiment of the main fuel injection nozzle to be incorporated in the engine of the present invention;

FIG. 8 is a vertical sectional view in somewhat diagrammatical illustration of an embodiment of the fuming fuel injection nozzle to be incorporated in the engine of the present invention;

FIG. 9 is a vertical sectional view in somewhat diagrammatical illustration of an embodiment of the fuel injection pump to be used for operating the engine of the present invention;

FIG. 10 is a partly broken away perspective view showing a part of the fuel injection pump shown in FIG. 9;

FIGS. 11a-11e are partly broken away perspective views showing several operating conditions of a part of the structure shown in FIG. 10;

FIG. 20 is principally a sectional view along line XX—XX in FIG. 19, wherein a sectional view along line XXXX—XXXX in FIG. 19 is partially incorporated;

FIGS. 21 and 22 are sectional views along lines XXI—XXI and XXII—XXII in FIG. 20, respectively;

FIG. 29 is a sectional view along line XXIX—XXIX in FIG. 28;

FIG. 31 is a sectional view along line XXXI—XXXI in FIG. 30;

FIG. 32 is a sectional view along line XXXII—XXXII in FIG. 31;

DESCRIPTION OF THE PREFERRED EMBODIMENTS

Figure 1:
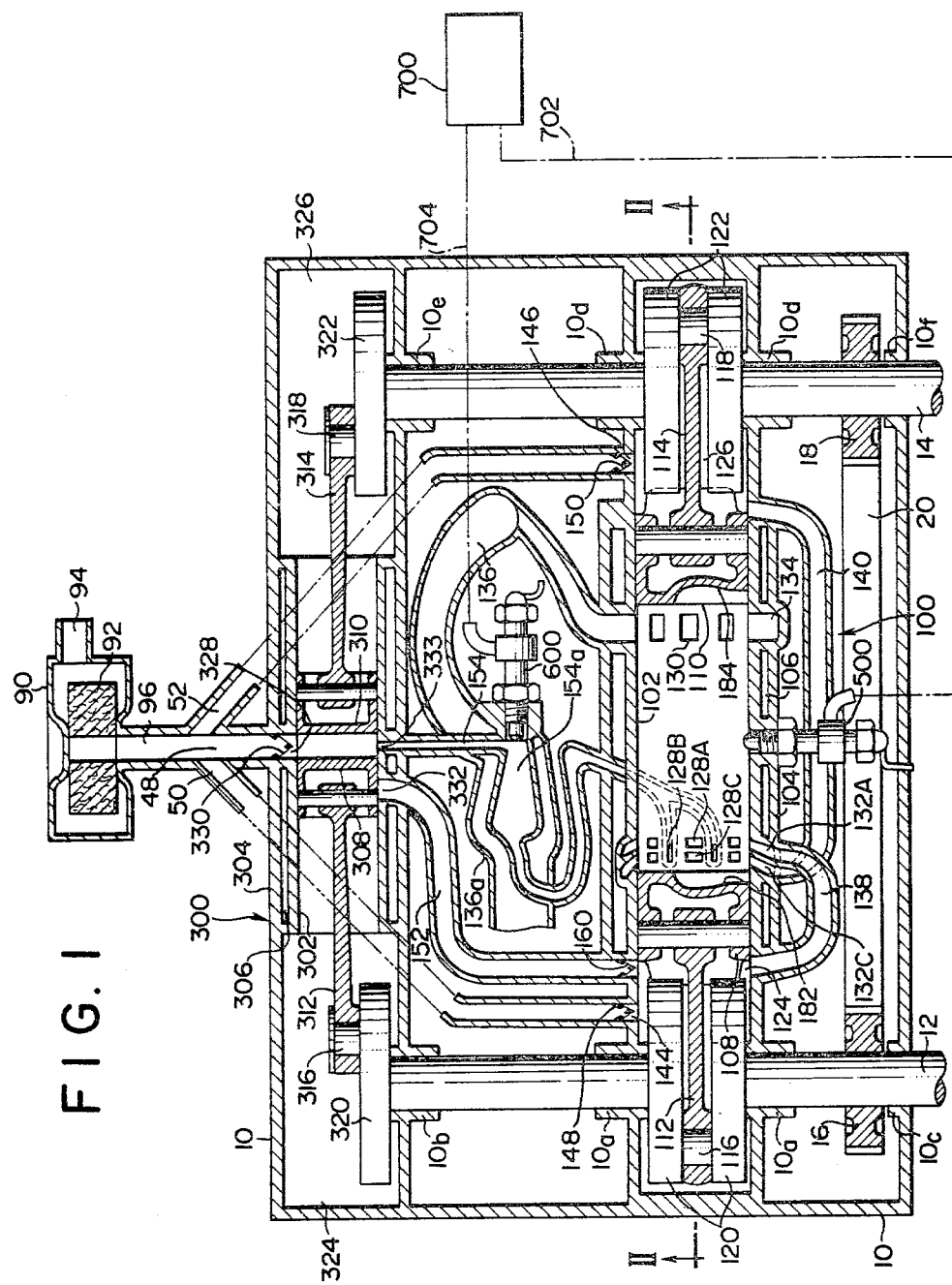
FIG. 1 is a diagrammatical plan sectional view showing a first embodiment of the two-stroke cycle diesel engine of the present invention.

Referring to FIGS. 1-4, showing the first embodiment of the present invention, the two-stroke cycle diesel engine herein shown comprises a cylinder block 10, the overall shape of which is like a relatively flat block rectangular in a plan view and adapted to be installed with its two largest faces arranged horizontally. In the cylinder block there are provided a pair of crankshafts 12 and 14 which are arranged along the opposite edges of the cylinder block and are rotatably supported by bearings 10a-10c, and 10d-10f, respectively. In this embodiment, for example, the crankshaft 12 may be connected to auxiliaries for the engine, while the crankshaft 14 may serve as the power output shaft of the engine. In the cylinder block 10 there are incorporated a power cylinder—piston assembly 100 and a supplementary scavenging pump 300, which is in this embodiment an independent pump cylinder—piston assembly having two horizontally opposed pistons.

First, the power cylinder—piston assembly 100 will be described. The assembly includes a power cylinder 102 supported by the cylinder block 10. The power cylinder is surrounded by a cooling jacket 106 defined by a jacket wall 104. In the cylinder 102 are arranged two power pistons 108 and 110, one being located on the scavenging side or the left side in the figure while the other is located on the exhaust side or the right side in the figure. The pistons 108 and 110 are respectively connected with connecting rods 112 and 114, which in turn are respectively connected with crankpins 16 and 118. The crankpins 116 and 118 are individually supported by crank arms 120 and 122, each of which has a disk shape. The two crank mechanisms each including the disk-shaped crank arm and the crank pin are individually housed in crankcases 124 and 126 having a corresponding internal shape so that regardless of rotational angle of the crank the principal internal space of each crankcase is occupied by the crank so as to reduce the clearance volume of the crankcase to the minimum value.

The cylinder 102 has a plurality of scavenging ports 128A, 128B, and 128C in its scavenging side and a plurality of exhaust ports 130 in its exhaust side. The scavenging ports include a first group of scavenging ports 128A, a second group of scavenging ports 128B, and a third group of scavenging ports 128C. As shown in FIG. 3, the scavenging ports 128A include two opposed scavenging ports 128Aa which open towards the central axis of the power cylinder 102, and six scavenging ports 128Ab which open along axes tengential to a phantom cylinder C contained in and coaxial with the cylinder 102, so that the first group of scavenging ports 128A are eight in total in the shown embodiment. As shown in FIGS. 3 and 4, and particularly as better shown in FIG. 4, the second group of scavenging ports 128B open along axes tangential to the phantom cylinder C in the same manner as do the scavenging ports 128Ab. In the shown embodiment the second group of scavenging ports 128B are provided as four in number. The third group of scavenging ports 128C include two opposed scavenging ports 128Ca which open towards the central axis of the power cylinder 102, and six scavenging ports 128Cb which open along axes tangential to the phantom cylinder C. Furthermore, all these scavenging ports are inclined towards the exhaust side of the cylinder so that the flows of scavenging air discharged from these scavenging ports have a velocity component towards the exhaust ports 130. The first and third groups of scavenging ports 128A and 128C are connected with first and second scavenging plenums 132A and 132C, which are closely arranged to one another, respectively, and the second group of scavenging ports 128B are connected with a scavenging manifold 132B as shown in FIG. 4. On the other hand, the exhaust ports 130 are connected with an exhaust plenum 134, which is connected with an exhaust pipe 136. The scavenging plenum 132A is connected with the crankcase 124 by a passage 138, while on the other hand the scavenging plenum 132B is connected with the crankcase 126 by a passage 140. The scavenging manifold 132B is, as described in detail hereinunder, supplied with scavenging air directly from the pump 300 by way of a passage 154, which includes, at a middle portion thereof, a fume generating chamber 154a of the fuming device, which is also described in detail hereinunder.

Next, the pump 300 will be described. The pump includes a pump cylinder 302 supported by the cylinder block 10. The pump cylinder 302 is surrounded by a cooling jacket 306 defined by a jacket wall 304. This cooling jacket serves to remove the compression heat of air generated in the pump 300 so as to increase the volumetric efficiency of the pump. For this purpose the cooling jacket 306 is connected with the cooling jacket 106 of the power cylinder by a passage means not shown in the figure. In the pump cylinder 302 are provided a pair of pump pistons 308 and 310 as opposed to one another. The pistons 308 and 310 are individually connected with connecting rods 312 and 314, which in turn are individually connected with crankpins 316 and 318. The crankpins 316 and 318 are individually supported by crank arms 320 and 322 which, in the shown embodiment, are individually formed as cantilever type crank arms for the purpose of reducing the weight of the engine. The crank mechanisms composed of the connecting rods, crankpins, and crank arms are individually housed in crankcases 324 and 326 which are connected with the internal space of an air cleaner 90 by a positive crankcase ventilation valve not shown in the figure. The crankshafts 12 and 14 are drivingly connected with each other by way of sprocket wheels 16 and 18 individually mounted on them and an endless chain 20 engaged around the sprocket wheels so that the crankshafts rotate in the same rotational direction at the same rotational speed. The phase relation between the two crankshafts is so determined that the crankpins 116 and 118 individually related to the power pistons 108 and 110 are shifted from each other by 180°. Depending upon such a phase relation between the crankshafts 12 and 14, the phase relation between the crankpins 316 and 318 individually related to the pump pistons 308 and 310 is also so determined that the crankpins are shifted from each other by 180°.

The air cleaner 90 includes an air cleaner element 92 and takes in air from its air inlet port 94 and delivers clean air through its air outlet port 96. The air outlet port 96 is connected with an inlet port 328 of the pump 300 by way of a passage 48 and is also connected with inlet ports 144 and 146 of the crankcases 124 and 126 by way of passages 50 and 52, respectively. In the port 328 is provided a reed valve 330 which allows air to flow only toward the pump chamber. Similarly, in the ports 144 and 146 are provided reed valves 148 and 150, respectively, each allowing air to flow only towards its crankcase. The pump 300 has a first outlet port 332 which is shifted from the axial midpoint of the pump cylinder 302 so as to be closed by one of the two pump pistons, i.e., the pump piston 308 in the shown embodiment, before the pump 300 reaches its TDC, and a second outlet port 333 located at the axial midpoint of the pump cylinder 302. The first outlet port 332 is connected with the crankcase 124 by way of a passage 152. The second outlet port 333 is connected with the scavenging manifold 132B by way of the passage 154, which includes, at a middle portion thereof, a fume generating chamber of the fuming device, as already described. At a middle portion of the passage 152 is provided, adjacent to the crankcase 124, a reed valve 160 in order to prevent reversed flow of air therethrough.

At the longitudinally central portion of the power cylinder 102 is provided a fuel injection nozzle 500. In this connection, although there is an inconsistency between FIGS. 1 and 2 with respect to the mounting position of the fuel injection nozzle 500, it is to be understood that it is desirable, in actual engines, that the fuel injection nozzle should be mounted in the position shown in FIG. 2, and that FIG. 1 shows the fuel injection nozzle diagrammatically displaced by 90°. The purpose of showing the fuel injection nozzle 500 in FIG. 1 in such a position is to show cavities 182 and 184 formed in the power pistons 108 and 110, respectively, in relation to the fuel injection nozzle 500. These cavities are provided so as to avoid direct interference between the piston head and spray of fuel ejected from the fuel injection nozzle at an angle of about 20°.

As already described, at a middle portion of the passage 154, which conducts scavenging air from the second outlet port 333 of the pump 300 to the second scavenging ports 128B, is provided a fume generating chamber 154a, which, in the shown embodiment, is formed as a generally cone-shaped chamber, at the apex portion of which is provided a fuel injection nozzle 600. The fume generating chamber 154a and the fuel injection nozzle 600 constitute a fuming device which administers a dose of fuel mist to the scavenging air supplied from the second outlet port 333 of the pump 300 to the second scavenging ports 128B over a certain time duration in the scavenging period. In this case, from the viewpoint of increasing the volumetric efficiency of the scavenging pump 300, it is desirable that the volume of the fume generating chamber 154a should be as small as possible. However, if this volume is too small, there is the danger that the fuel ejected from the fuel injection nozzle 600 should attach onto the inner wall of the fume generating chamber and desirable fuel fume should not be available. Therefore, a certain volume is required for the fume generating chamber as a compromise between these two conditions. However, as already explained, it is not all of the scavenging air but only a part of the scavenging air which is supplied in an initial part of the scavenging period, i.e., in more detail, desirably only a very small amount of scavenging air which is supplied subsequently to the very beginning portion of the scavenging air, which is converted into fume in accordance with the present invention, and therefore the amount of fuel injected from the fume generating fuel injection nozzle 600 is very small relative to the total amount of fuel supplied to the power cylinder. Therefore, the fuel injection nozzle 600 may be of a relatively small capacity as compared with the main fuel injection nozzle 500, and in accordance with this the fume generating chamber 154a which receives fuel mist atomized from this fume generating fuel injection nozzle may have a correspondingly relatively small volume. In this connection, it is desirable that the fume generating chamber 154a should be enclosed by a heating hood 136a formed as a part of the exhaust pipe 136, as shown in FIG. 1, so that the inner wall of the fume generating chamber is heated by exhaust gases, whereby it is effected that fuel particles attached onto the inner wall of the fume generating chamber are rapidly vaporized so as to expedite decomposition of fuel in the power cylinder as well as to avoid any accumulation of liquid fuel on the inner wall of the fume generating chamber.

Although in FIG. 1 the air cleaner 90, passages 50 and 52, ports 144 and 146, passages 152 and 154, fume generating chamber 154a provided at a middle portion of the passage 154, fuel injection nozzle 600 which injects fuel for generating fume into the fume generating chamber 154a, heating hood 136a which conducts exhaust gases around the fume generating chamber 154a, and passages 138 and 140 are shown as developed in a plan view for the convenience of illustration, in the actual engine it is desirable that these means or structures should be three-dimensionally constructed in the following manner. With respect to the passages 138 and 140, it is desirable that these passages should open individually between the pair of crank arms 120 and 122 so that the flow of air is not obstructed by the crank arm 120 or 122 or the piston 108 or 110. Further, it is desirable that the passages 138 and 140 should open to the bottoms of the crankcases so that lubrication oil which leaks out into the crankcases and flows down therein can be readily taken out by the passages so as to be supplied into the power cylinder. It is also desirable that the ports 144 and 146 should open between the pair of crank arms 120 and 122 so that the flow of air is not obstructed by the arms 120 and 122. It is desirable that the air cleaner 90 should be arranged at the top of the engine so that mud or water splashed up from the road does not enter into it. Furthermore, as seen in FIG. 1, it is desirable that the power assembly 100 and the pump assembly 300 should be arranged as close to one another as possible. In this connection, therefore, it is desirable that the passages 152 and 154, the fume generating chamber 154a provided at a middle portion of the passage 154, and the heating hood energized by exhaust gases for heating the fume generating chamber should be arranged through the clearance left between the power assembly 100 and the pump assembly 300. The port through which the passage 152 opens to the crankcase 124 may be located so as to oppose the crank arms 120 or the piston 108, if the port is adapted so as not to be strongly throttled, because the air supplied through the passage 152 is pressurized by the pump.

Figure 5:
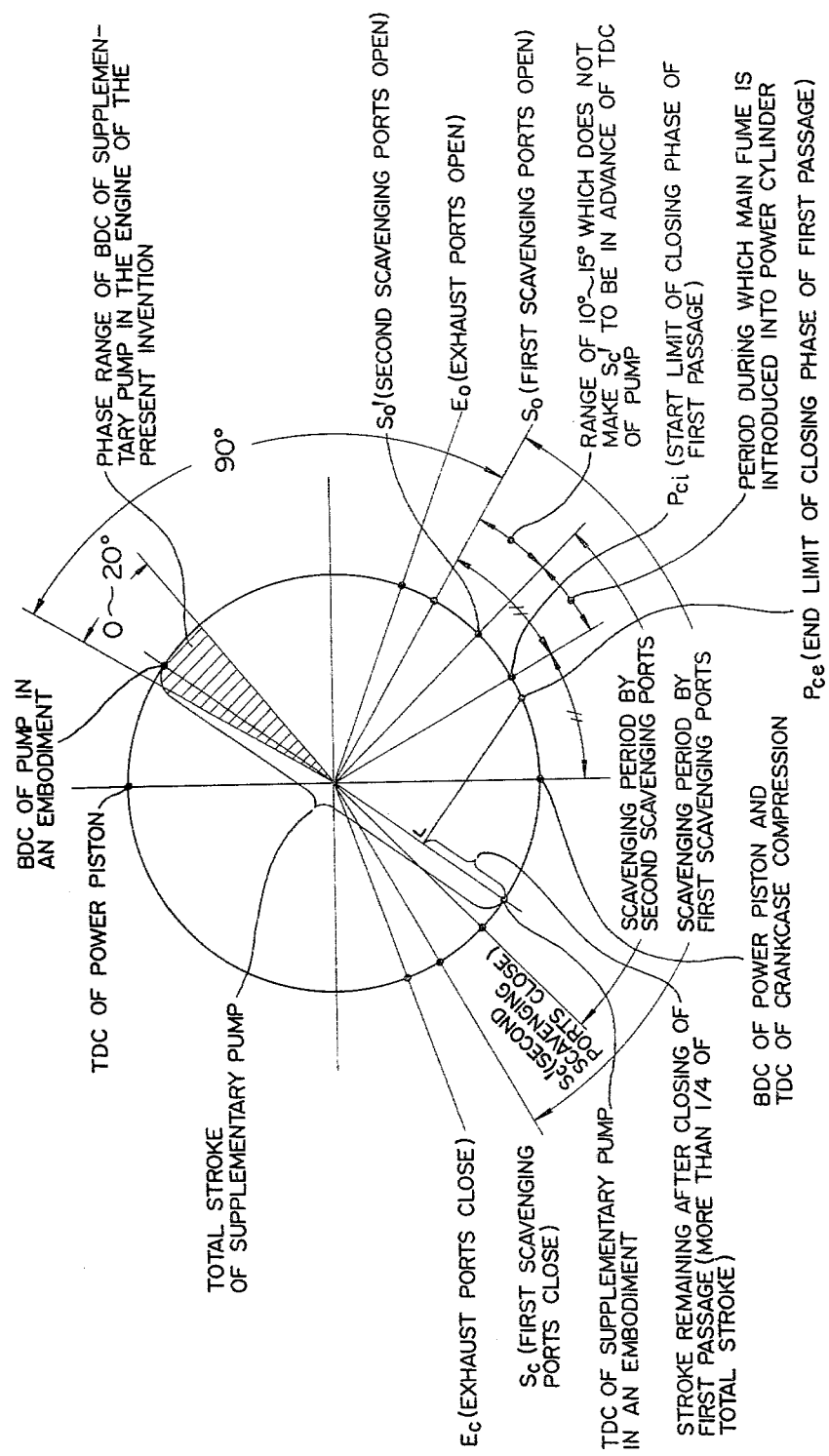
FIG. 5 is a crank angle diagram showing operational phases of a two-stroke cycle diesel engine of the present invention which incorporates crankcase compression, such as the embodiment shown in FIGS. 1-4.
Figure 6:
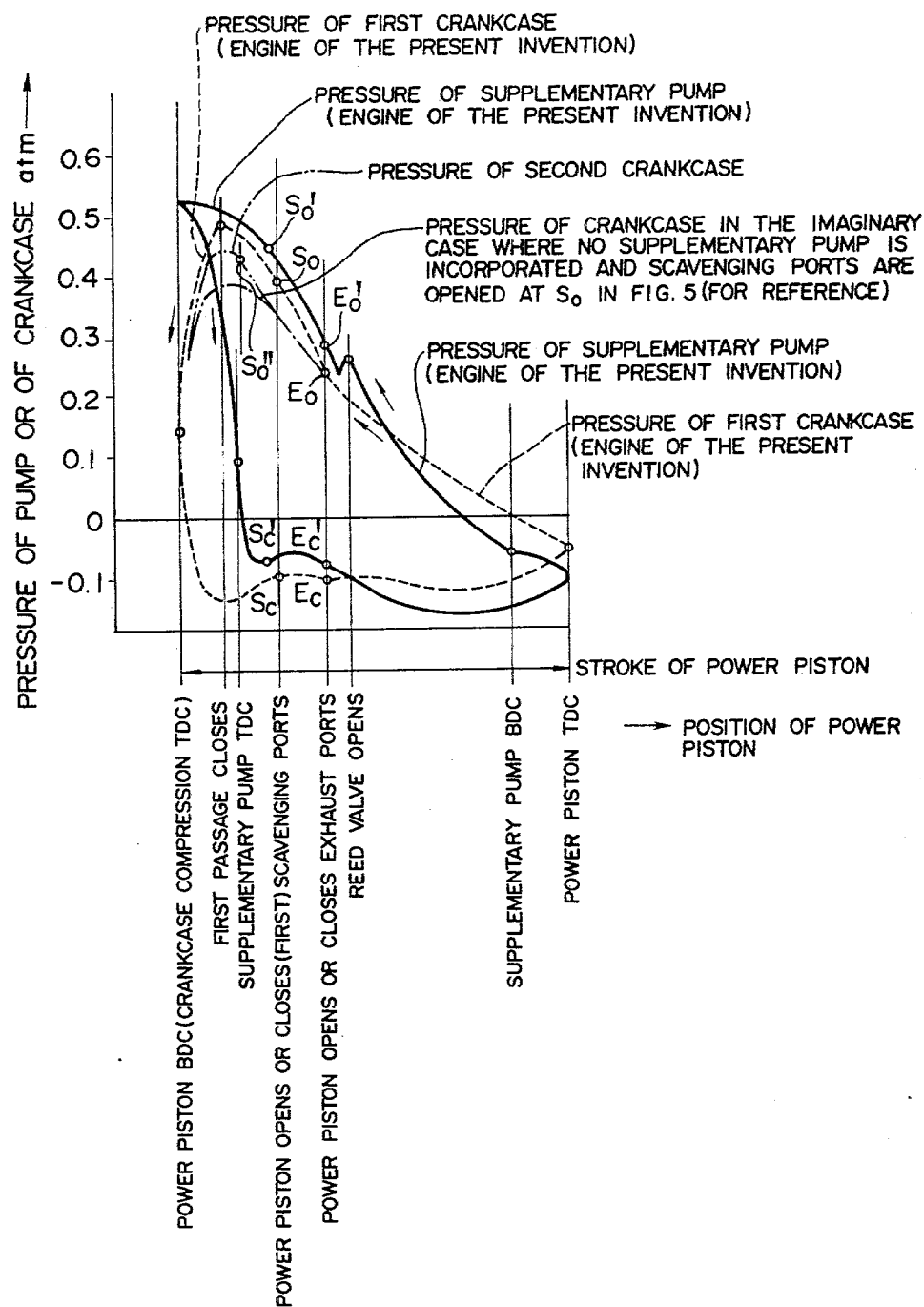
FIG. 6 is an indicator diagram showing the pressures of the supplementary scavenging pump and the crankcase compression relative to the position of the power piston in a two-stroke cycle diesel engine of the present invention which incorporates crankcase compression, wherein the crankcase pressure in a similar engine incorporating only crankcase compression is also shown for the purpose of comparison.

As already described, it is a basic structure of the two-stroke cycle diesel engine of the present invention to scavenge the power cylinder by scavenging air of high pressure and large amount obtained from a pump cylinder-piston assembly separate from the power cylinder-piston assembly and which is provided in addition to or in place of the crankcase compression effected by the power cylinder-piston assembly. Therefore, it is required that when the scavenging ports are opened, i.e., when the first group of scavenging ports 128A are opened in the embodiment shown in FIGS. 1–4, a substantially high scavenging pressure should already be available. For this purpose, in the engine of the present invention, as shown in the crank angle diagram of FIG. 5, the BDC of the pump 300 is positioned in a phase range between 0°–20° behind the phase point which is 90° in advance of the first scavenging port opening phase point So. (In the embodiment shown in FIG. 5 the pump BDC is actually positioned 6° behind the phase point which is 90° in advance of the first scavenging port opening phase point). Further, in the embodiment shown in FIG. 5, the first scavenging port opening phase point So is 60° in advance of power piston BDC. When the pump pistons 308 and 310 move from their BDC to their TDC, the air existing in the pump cylinder 302 is discharged towards the first and second passages 152 and 154. As seen in FIG. 6, when the supplementary scavenging pump 300 is in a condition close to its BDC, the pressure in the crankcase is higher than that of the pump 300. When the crank further rotates so far that the pump pressure becomes higher than the crankcase pressure and the pressure difference therebetween once overcomes the resistance of the reed valve 160, the air from the pump pushes the reed valve 160 open and flows into the first crankcase 124. At this moment, as seen in FIG. 6, the pressure of the supplementary scavenging pump temporarily slightly lowers. Thereafter, the pressure in the first crankcase 124 increases due to the supply of scavenging air by the pump 300. In this case, as seen in FIG. 6, the pump pressure is slightly higher than the pressure in the first crankcase in order to maintain the reed valve 160 in its open condition.

As seen in FIG. 6, at a time when the pressure in the first crankcase 124 begins to increase steeply due to the supply air from the supplementary scavenging pump 300, the power piston 110 reaches the exhaust port opening phase point Eo and begins to open the exhaust ports 130, and thereby exhausting of exhaust gases from the power cylinder is initiated. When the crankcase has further somewhat rotated, the power piston 108 reaches the scavenging port opening phase point So, and the scavenging ports are gradually opened from the side of the ports 128A, and in accordance with this the air supplied from the crankcase 124 through the passage 138 is introduced into the power cylinder through the first scavenging ports 128A in a manner of generating a relatively weak swirl flow in the power cylinder. The scavenging air thus introduced into the power cylinder urges the exhaust gases existing in the power cylinder toward the exhaust ports 130, while the scavenging air itself forms a layer of air which gradually increases in thickness. As seen in FIG. 1 or 2, since the second scavenging ports 128B are shifted towards the side of the crankcase 124 relative to the first scavenging ports 128A, the scavenging ports 128B are opened at the second scavenging port opening phase point So', which is somewhat behind the first scavenging port opening phase point So, as seen in FIG. 5. When the second scavenging ports 128B are opened, scavenging air directly supplied from the pump 300 to the second scavenging ports through the passage 154 including the fume generating chamber 154a at a middle portion thereof is introduced into the power cylinder. This scavenging air includes fuel mist atomized from the fuel injection nozzle 600 which is adapted so as to be operated over a certain time duration in the initial period of supplying scavenging air from the second scavenging ports. Therefore, over a certain time duration from the beginning of the opening period of the second scavenging ports 128B the ports supply fume including fuel mist. As seen in FIG. 5, although a certain phase angle lapses after the second scavenging ports have opened until the first passage 152 closes, the pressure difference between the supplementary scavenging pump and the crankcase compression in this phase region is substantially zero, except for the pressure difference existing across the reed valve 160. Therefore, the air supplied from the crankcase 124 and ejected through the first scavenging ports 128A and the fume ejected through the second scavenging ports 128B directly by the pressure of the pump 300 are introduced into the power cylinder under substantially the same pressure so as to generate parallel joint flows which travel through the power cylinder as a whole without causing any substantial turbulence due to shearing dependent upon speed difference therebetween. Thus, until the first passage 152 is closed, the first and second scavenging ports 128A and 128B introduce scavenging air into the power cylinder in a manner of generating a slow swirl in the power cylinder, so as to urge exhaust gases gradually towards the exhaust ports 130, while maintaining a stratified condition between the exhaust gases and the scavenging air. During this process, in the power cylinder 102, there exist, as seen from the side of the exhaust port 130, a layer of exhaust gases, a relatively thin layer of air composed of the air introduced into the power cylinder in the initial stage of opening of the first scavenging ports 128A, and a layer in which the air introduced from the first scavenging ports 128A and the fume introduced from the second scavenging ports 128B are slightly mixed. In this case, since the thin layer of air, which is in direct contact with the layer of exhaust gases, is slowly swirling together with the layer of slightly mixed air and fume, shearing is caused in the thin layer of air due to speed difference between itself and the layer of exhaust gases, and in accordance with this slight turbulence is caused in the thin layer of air, which operates to transmit heat by convection from the layer of exhaust gases to the fume, whereby the fume, particularly its portion existing close to the layer of exhaust gases, receives strong heating action by the heat of the exhaust gases.

When the scavenging in the abovementioned stratified condition has proceeded so far that there exists no longer the danger of causing undesirably strong mixing between the scavenging air and the exhaust gases even if strong swirl is given to the scavenging air, the pump piston 308 closes the first outlet port 332, i.e. the first passage 152. When the first passage 152 is closed, all the air delivered thereafter from the pump 300 is conducted through the second passage 154 to be introduced into the power cylinder through the second scavenging ports 128B. Therefore, the air is ejected at high speed from the second scavenging ports 128B and generates strong swirl flow of scavenging air in the power cylinder.

As exemplarily shown in FIG. 5, the second scavenging ports 128B are arranged so as to be opened 5°–15° behind the first scavenging ports 128A. This is so determined, as described hereinabove, in order to spare expense of scavenging air in the initial stage of scavenging, so that a large amount of scavenging air remains in the pump 300 when strong swirl flow of air needs to be generated in the power cylinder in the latter stage of scavenging. In this connection, however, since the second scavenging port closing phase point Sc' is positioned so as to be symmetric to the second scavenging port opening phase point So' with respect to the line which connects TDC and BDC of the power piston as viewed in the crank angle diagram, due to the symmetry between the opening and the closing phase points for scavenging ports, the relation between the second scavenging port closing phase point Sc' and pump TDC must be considered. If the second scavenging port closing phase point Sc' is in advance of pump TDC, the second scavenging ports are closed before the pump 300 has delivered all of its compressed scavenging air. Therefore, the second scavenging port opening phase point So' must be so determined as to satisfy the condition that the second scavenging port closing phase point Sc' is not in advance of pump TDC, i.e., the second scavenging port opening phase point So' is in advance of a phase point which is symmetric to the pump TDC relative to the line which connects TDC and BDC of the pump piston as viewed in the crank angle diagram. In this case, in consideration of the matter that there is a time delay before the scavenging air discharged from the pump 300 reaches the second scavenging ports 128B, it is desirable that the second scavenging port opening phase point So' should be in advance of the phase point which is symmetric to the pump TDC relative to the line which connects TDC and BDC of the power piston by an angle which corresponds to said time delay. Since, however, the change of the position of the pump piston relative to the change of the crank angle is small in the vicinity of pump TDC, it will cause in practice no great disadvantage for the second scavenging port closing phase point and pump TDC to be at the same phase point.

The phase point at which the delivery port 332 of the supplementary scavenging pump 300 is closed by the pump piston 308 so that the passage 152 is isolated from the supplementary scavenging pump is so determined as to be in a phase region between the start limit (point Pci in FIG. 5), which is the midpoint of the first scavenging port opening phase point So and power piston BDC, and an end limit (point Pce in FIG. 5), at which the pump piston of the pump 300 has ¼ of its total stroke travel remaining before it reaches its top dead center. In this case, the phase point at which the port 332 is closed and the passage 152 is isolated means the phase point at which the port 332 is completely closed by the pump piston 308 and the flow of scavenging air through the passage 152 is completely interrupted. The abovementioned conditions for the closing phase point of the passage 152 have been determined in consideration of the fact that the pump 300 needs to supply compressed scavenging air to the crankcase 124 at least up to a phase point such as the aforementioned start limit if it should operate as a booster for increasing the pressure in the crankcase 124 so that the pressure of scavenging air ejected from the first scavenging ports 128A is sufficiently high so as to effect desirable scavenging on the one hand, while on the other hand in consideration of the fact that a sufficient amount of scavenging capacity must be retained in the pump 300 when the passage 152 is isolated from the pump 300 and the air compressed in the pump 300 is all supplied to the second scavenging ports 128B for strong swirl flows to be generated in the power cylinder by the scavenging air ejected from the second scavenging ports 128B subsequent to the supply of scavenging air from both first and second scavenging ports 128A and 128B, the supply from the second scavenging ports 128B, including fume over a certain time duration in the initial stage of scavenging, which is principally intended for pushing exhaust gases in the power cylinder out of it and which forms a relatively moderate swirl flow in the power cylinder. In this case, in accordance with the manner of selection with regard to the crank angle between the first scavenging port opening phase point So and power piston BDC and with regard to the advance angle of pump BDC relative to the first scavenging port opening phase point So the aforementioned start and end limits may occur in reversed sequence. In such a case, a proper midpoint between the two limit points may be selected as the phase point for the closing of the passage 152 so that a compromise between the conditions with regard to the start and end limits is obtained.

After the delivery port 332 has been closed, the pressure in the first crankcase 124 begins to lower, and further it abruptly lowers at and in the vicinity of power piston BDC. Even after the delivery port 332 has been closed, the supply of scavenging air from the second delivery port 333 provided at the axial midpoint of the pump cylinder 302 to the second scavenging ports 128B through the second passage 154 including the fume generating chamber 154a at a middle portion thereof continues. In the present embodiment, as already explained with reference to FIG. 4, the second scavenging ports 128B are four in number, which is fewer than the eight in number of the first scavenging ports 128A, and further the opening area of each opening of one second scavenging port 128B is substantially smaller than each one opening of first scavenging port 128A, and therefore the total opening area of the second scavenging ports is substantially smaller than that of the first scavenging ports. Therefore, after the first passage 152 has been closed so that all of the air delivered from the pump 300 is supplied to the second scavenging ports, the air is ejected from the second scavenging ports as strong jets which generate strong swirl flows of scavenging air in the power cylinder. Since the reciprocating speed of the pump piston increases in accordance with increase of the rotational speed of the engine, stronger swirl flows are generated in the power cylinder as the rotational speed of the engine becomes higher. As an example, the total opening area of the second scavenging ports 128B may be approximately ⅓ of the total opening area of the first scavenging ports 128A. In this connection, a stronger swirl flow is generated in the power cylinder as the engine rotational speed increases because the pump rotational speed also increases correspondingly.

When the pump BDC is shifted behind the power piston TDC by a substantially large phase difference, as in the engine of the present invention, the pressure in the crankcase is higher than the delivery pressure of the pump over a relatively wide phase region, as seen in FIG. 6. In such a case a reed valve 160 needs to be provided in the first passage 152, as shown in FIG. 1, to prevent reverse flow of scavenging air from the crankcase to the pump. If a check valve such as the reed valve 160 is not provided in the first passage 152, when the power cylinder has proceeded to its expansion stroke past power piston TDC, the pump 300 which is still performing its suction stroke draws air from the crankcase 124, thereby reducing the amount of intake air drawn through the air cleaner 90, so that the total amount of intake air is reduced.

After the first passage 152 has been closed, the pressure in the first crankcase 124 abruptly lowers at and in the vicinity of power piston BDC, as shown in FIG. 6. On the other hand the pressure of the scavenging air supplied to the second scavenging ports 128B throguh the second passage 154 further increases for a certain duration, but this also abruptly lowers at and in the vicinity of pump TDC. The amount of scavenging air supplied to the second scavenging ports 128B through the second passage 154 after the first passage 152 has been closed is determined by the amount of pump piston stroke left in the supplementary scavenging pump 300 at the moment of closing of the first passage 152, which, as already mentioned, should desirably be more than ¼ of the total stroke of the pump 300. In this case the amount of scavenging air actually supplied to the second scavenging ports 128B from the pump 300 after the passage 152 has been closed is affected by the clearance volume included in the passage 154 and other spaces.

The scavenging air compressed in the first crankcase 124 is supplied into the power cylinder 102 through the passage 138, scavenging plenum 132A, and scavenging ports 128A. On the other hand, the air compressed in the second crankcase 126 is supplied into the power cylinder 102 through the passage 140, scavenging plenum 132C, and third scavenging ports 128C. Since the first crankcase 124 is supplied with air compressed by the supplementary scavenging pump 300 through the passage 152, at the scavenging port opening phase point So the pressure in the crankcase 124 is substantially higher than that in the crankcase 126 which is not supplied with compressed air from the supplementary scavenging pump 300 and in which air is compressed only by crankcase compression. However, since the third scavenging ports 128C are shifted relative to the first scavenging ports 128A so that the third scavenging ports 128C are opened behind the first scavenging ports 128A and so that the phase point at which the third scavenging ports 128C are opened is closer to power piston BDC than the first scavenging port opening phase point, the crankcase pressure at the third scavenging port opening phase point So″ is higher than the pressure available from only crankcase compression when the scavenging ports are opened at the phase point So in FIG. 5, i.e. the pressure on the dot-dash line curve in FIG. 6. Therefore, the scavenging air supplied from the second crankcase effectively works to back up the scavenging air supplied from the first crankcase, particularly when high scavenging pressure is required in high speed operation of the engine.

The supplementary scavenging pump 300 will now be described with respect to its stroke volume. Although the scavenging medium in the diesel engine of the present invention is not air only but includes fume containing fuel mist, since the fume is not supplied so as to form a layer which directly contacts exhaust gases, but is supplied so as to leave a thin intermediate air layer therebetween, even when blow-out of scavenging medium partly occurs, no direct loss of fuel is suffered, in contrast to gasoline engines. Therefore, it is allowable that a proportion of the scavenging air, such as 0.05–0.25 times as much as the total stroke volume of the power piston, should blow out, provided perfect scavenging is performed. In this case, since the heating of the fume effected by the layer of exhaust gases is attenuated if the intermediate air layer is made thicker, it is desirable that the intermediate air layer should be as thin as possible under the condition that no substantial blow-out loss of fuel occurs when complete scavenging is accomplished. By taking this into consideration, when the engine incorporates crankcase compression as shown in FIGS. 1–4, the total stroke volume of the pump cylinder-piston assembly 300 is determined to be 0.4–1.1 times as large as that of the power cylinder-piston assembly 100. A particular value which is to be selected within this range is determined as follows:

The rotational speed of the engine which will most frequently occur in full throttle operation of the engine is determined, and the stroke volume of the pump 300 is determined so that it delivers an amount of scavenging air which will just scavenge the exhaust gases existing in the power cylinder out of the exhaust ports 130 with blow-out of scavenging air within the aforementioned allowable limit when they are closed by the power piston 110 when the engine is operating at said most frequent full throttle rotation speed. The pressure in the pump cylinder 302 varies as shown in FIG. 6, and the pressure in the first crankcase at the scavenging port opening phase point (So) has the value of the point designated by So. At this pressure scavenging air is ejected through the first scavenging ports 128A into the cylinder 102, although the pressure is slightly reduced by the throttling action at the scavenging ports. The scavenging air ejected from the scavenging ports 128A forms spiral flows in the cylinder which urge the exhaust gases existing in the cylinder towards the exhaust ports 130. In this connection, it is the scavenging air ejected from the scavenging ports 128Ab which forms spiral flows, while the scavenging air ejected from the scavenging ports 128Aa flows along the central axis of the power cylinder. However, the major flow of scavenging air in the power cylinder is the spiral flows formed by the scavenging air ejected from the scavenging ports 128Ab, and therefore the time required for the scavenging air to reach the exhaust ports is substantially determined by the difference between the pressure of the scavenging air and that of the exhaust gases existing in the cylinder, and by the length of the spiral path traveled by the scavenging air while it flows from the scavenging ports to the exhaust ports. This time duration is not directly related to the rotational speed of the engine. Therefore, if the shape and arrangement of the scavenging and exhaust ports are determined, this time duration is determined by the scavenging pressure at the phase point So, and by its subsequent pattern of change. As seen in FIG. 6, in this embodiment the pressure of the scavenging air ejected from the first scavenging ports 128A gradually increases from the phase point So, and therefore the scavenging air which has first been ejected into the power cylinder is well supported by the air subsequently ejected from the same scavenging port, whereby scavenging of the exhaust gases by the air is effectively performed. After a lapse of time from the phase point So the second scavenging ports 128B are further opened, and the scavenging air (fume in a certain period in the initial stage) supplied directly from the supplementary scavenging pump 300 through the second passage 154 is ejected at the pressure of the point So' so as to join and support the scavenging air ejected from the first scavenging ports 128A. At this time, since the pressure in the crankcase 124 is increasing, scavenging air is ejected from the scavenging ports 128A and 128B at a substantially constant pressure, and travels toward the side of the exhaust ports while moderately swirling as a whole in the power cylinder. After a further lapse of time the third scavenging ports 128C are opened, whereby the air supplied from the second crankcase 126 through the passage 140 is ejected into the power cylinder at the pressure of the point So" so as further to support the preceding scavenging air. After the first passage 152 has been closed, supply of scavenging air from the first crankcase 124 is weakened, although the supply of scavenging air from the first scavenging ports 128A still continues. The scavenging by the second crankcase 126 through the third scavenging ports 128C is also maintained. These scavengings by the first and the second crankcases are rapidly weakened as the power piston approaches its BDC. However, these scavengings are still maintained for a while even after the bottom dead center of the power piston. On the other hand, the scavenging air supplied through the second passage 154 continues to flow into the power cylinder at high pressure, and particularly, after the first passage 152 has been closed, the air delivered from the pump 300 is all supplied through the second passage 154 to the second scavenging ports 128B, whereby strong swirl flows are generated in the power cylinder. However, the supply of air through the second passage 154 also fades out after the lapse of a time after the top dead center of the scavenging pump.

If the suction inertia is neglected, the volumetric efficiency of a reciprocating pump becomes higher as its rotational speed becomes lower. Furthermore, the time required for the scavenging air to travel from the scavenging ports to the exhaust ports is determined by scavenging pressure, exhaust pressure, arrangement of the scavenging and exhaust ports, etc., and is not directly related to the rotational speed of the engine. Therefore, if the engine is so arranged that, at a certain rotational speed (which is called "matching rotational speed") when scavenging air has just pushed exhaust gases out of the exhaust ports with a predetermined amount of scavenging air blow-out, the exhaust ports are closed, then below the matching rotational speed blow-out escaping of air to the exhaust manifold will increase, while on the other hand above the matching rotational speed the blow-out amount will decrease and then exhaust gases will remain in the cylinder 102. Therefore, if it is intended that the engine should produce high torque at high rotational speed, the stroke volume of the pump 300 must be increased so as to increase the scavenging pressure. In this case, when the engine is operated at low speed with full throttle, blow-out of air to the exhaust manifold will increase. When there exists an exhaust inertia effect in the exhaust pipe this will also affect the time required for the exhaust gases to reach the exhaust ports. If the stroke volume of the supplementary scavenging pump is too small, due to the effect of the clearance volume of the first crankcase and the throttling action by the scavenging ports, the scavenging pressure at the scavenging port opening phase point So will not be high enough so that the scavenging pressure will remain almost without increasing after the opening of the scavenging ports or will abruptly lower. On the other hand, if the stroke volume of the supplementary scavenging pump is too large, the scavenging pressure after So will become too high. In this case, due to such a high scavenging pressure, the scavenging air will mix with the exhaust gases so as to increase blow-out of scavenging air to the exhaust manifold, thereby reducing scavenging efficiency, while on the other hand a part of the scavenging air delivered from the supplementary pump will remain in the passage located before the scavenging ports, without being effectively introduced into the power cylinder 102, when the scavenging ports are closed. If a large amount of scavenging air remains in such a passage, although a part of the work consumed for the compression of scavenging air is recovered as force for driving the pump in the next suction stroke, pumping power required will increase, thereby decreasing the effective output power of the engine. Furthermore, since in this case a correspondingly large amount of scavenging air remains in the pump 300 after the first passage has been closed, if a large amount of scavenging air is supplied through the second passage 154 having a greater throttling effect, the power required for driving the pump increases, thereby increasing the load of the engine, so as to decrease the effective output power of the engine.

The aforementioned lower and upper limits with respect to the ratio of the stroke volume of the pump cylinder-piston assembly 300 to that of the power cylinder-piston assembly 100 are two of the factors which are necessary for the scavenging by high pressure and a large amount of scavenging air which is one of the features of the engine of the present invention, and has the following characteristics. In conventional two-stroke cycle engines depending only upon crankcase compression, the delivery ratio is about between 0.5–0.8. Now, let us assume that the stroke volume of the supplementary scavenging pump 300 is 1.1 times as large as the stroke volume of the power cylinder-piston assembly 100, and that, in view of the aforementioned ratio and the fact that a part of the delivery from the supplementary pump remains in the crankcase, 70% of the delivery from the supplementary scavenging pump is actually supplied to the power cylinder 102. Further, let us assume that, if the supplementary scavenging pump 300 is not provided, the delivery ratio by the crankcase compression due to crankcases 124 and 126 is 0.5. In this case, the delivery ratio L in this embodiment is given as follows:

$$L = 1.1 \times 0.7 + 0.5 = 1.27 \tag{1}$$

Let it be assumed that out of this scavenging air an amount of 0.25 times as large as the total stroke volume of the power cylinder-piston assembly is blown out, i.e., that air of the amount of $1.02 = (1.27 - 0.25)$ times as large as the total stroke volume of the power piston is held in the power cylinder. Further, let it be assumed that the pressure of the scavenging air in the power cylinder 102 at the scavenging port closing phase point Sc is about 1.3 ata (absolute pressure) and that the density of the scavenging air in this condition, corrected with regard to temperature increase from atmospheric temperature, is 1.3 times that of atmospheric air. Then, expressing the stroke volume of the power cylinder-piston assembly 100 by Vs, the volume (Vsc) of scavenging air supplied to the power cylinder 102 is expressed as follows:

$$Vsc = 1.02 \, Vs/1.3 = 0.78 \, Vs \tag{2}$$

The volume Vec which is confined by the power cylinder and the piston heads of the power pistons when the exhaust port side power piston closes the exhaust ports is approximately 0.78 Vs. In this case, therefore, Vec is equal to Vsc, and therefore the scavenging air clears the exhaust gases out of the power cylinder with a slight blow-out of air so that it fully occupies the space defined in the power cylinder when the exhaust ports are closed. In this connection, by reducing the clearance volume of the crankcase, by increasing the delivery ratio due to crankcase compression, and by reducing the portion of the scavenging air delivered from the supplementary scavenging pump which remains in the crankcase, the stroke volume of the supplementary scavenging pump required for ensuring the same amount of scavenging air is reduced.

On the other hand, in the case of a supplementary scavenging pump having stroke volume which is 0.4 times as large as that of the power cylinder-piston assembly, if it is assumed that the ratio of the delivery volume to the stroke volume of the supplementary scavenging pump is 70%, and that the delivery ratio due only to crankcase compression is 0.8, the delivery ratio L is given by the following:

$$L = 0.4 \times 0.7 + 0.8 = 1.08 \tag{3}$$

If it is assumed that out of this scavenging air the proportion of 0.05 (ratio to the total stroke volume of the power cylinder) blows out through the power cylinder to the exhaust manifold, an amount of 1.03 (ratio of the same kind as above) is retained in the power cylinder. If in this case it is also assumed that the density of the scavenging air in the power cylinder is 1.3 times that of atmospheric air, the volume of the scavenging air retained in the power cylinder is 0.79 times as large as the total stroke volume of the power cylinder. This volume is approximately equal to the volume Vec which is confined by the power cylinder and the piston heads of the power pistons when the exhaust port side power piston closes the exhaust ports. In this case, therefore, it also occurs that the scavenging air clears the exhaust gases out of the power cylinder with a slight blow-out of air when the exhaust ports are closed. Therefore, in accordance with the requirement with regard to the volumetric efficiency of the power cylinder and in accordance with the design of the crankcase with regard to the delivery ratio of crankcase compression, the required stroke volume of the supplementary scavenging pump changes. In this connection, although the volumetric efficiency of the pump changes in accordance with the rotational speed of the engine, since a relatively wide range of blow-out of scavenging air is allowed in diesel engines (in contrast to gasoline engines), the change of the volumetric efficiency of the pump due to changes of the rotational speed of the engine is relatively easily accepted.

Next, considerations with respect to the scavenging pressure are made. The clearance volume due only to the crankcases is generally 2–3 Vs, and therefore the compression ratio is 1.5–1.3. If a special design such as filling up the back of the pistons is used, the clearance volume can be reduced to about 1.3 Vs (compression ratio = 1.75). As an example, assuming that the scavenging air delivered from the supplementary scavenging pump is supplied only to the first crankcase 124, as in the embodiment shown in FIGS. 1–4, that the clearance volume of the first crankcase is, expressing the stroke volume of the first crankcase by Vss ($= \frac{1}{2}$ Vs), 2 Vss, that the stroke volume of the supplementary scavenging pump is 1.1 $Vs = 2 \times 1.1$ Vss, that the clearance volume of the supplementary scavenging pump, the first passage 152, and the second passage 154 is, in sum, 0.15 Vss, and that the crank angle between the bottom dead center of the supplementary scavenging pump and the scavenging port opening phase point So is 80°, then the maximum volume of the system composed of the supplementary scavenging pump 300, the first crankcase 124, the first passage 152, and the second passage 154 is the sum of the volume of the first crankcase (3 Vss), the stroke volume of the supplementary scavenging pump (2.2 Vss), and the clearance volume of the first and second passages (0.15 Vss), that is;

$$3 \, Vss + 2.2 \, Vss + 0.15 \, Vss = 5.35 \, Vss \tag{4}$$

On the other hand, the volume of the aforementioned system at the scavenging port opening phase point So is as follows. If the crank angle between the scavenging port opening phase point So and the bottom dead center of the power piston is 60°, the volume of the first crankcase is:

$$2 V_{ss} + (\tfrac{1}{4}) V_{ss} = 2.25 V_{ss} \quad (5)$$

Further, since the crank angle between the bottom dead center of the supplementary scavenging pump and the scavenging port opening phase point So is 80°, at the scavenging port opening phase point the volume defined by the supplementary scavenging pump and the first and second passages is:

$$(2.2/2)(1 + \cos 80°) V_{ss} + 0.15 V_{ss} = 1.44 V_{ss} \quad (6)$$

Therefore, the volume of the aforementioned system at this moment is:

$$2.25 V_{ss} + 1.44 V_{ss} = 3.69 V_{ss} \quad (7)$$

Therefore, the compression ratio (CRso) at the scavenging port opening phase point So is:

$$CR_{so} = 5.35 V_{ss}/3.69 V_{ss} = 1.45 \quad (8)$$

Since the volumetric efficiency in the suction of air into the first crankcase and the supplementary scavenging pump is less than 100%, when the compression ratio CRso is 1.45, the scavenging pressure at the scavenging port opening phase point So will be about 1.4 ata.

Based upon the above conditions, when the crank angle between the bottom dead center of the supplementary scavenging pump and the scavenging port opening phase point So is 90°−0°=90°, the compression ratio CRso is as follows:

$$CR_{so} = 5.35 V_{ss}/[2.25 V_{ss} + (2.2/2)(1 + \cos 90°)$$
$$V_{ss} + 0.15 V_{ss}] = 1.52 \quad (9)$$

Based upon the above conditions, when the crank angle between the bottom dead center of the supplementary scavenging pump and the scavenging port opening phase point So is 90°−20°=70°, the compression ratio CRso is as follows:

$$CR_{so} = 5.35 V_{ss}/[2.25 V_{ss} + (2.2/2)(1 + \cos 70°)$$
$$V_{ss} + 0.15 V_{ss}] = 1.38 \quad (10)$$

Further, based upon the above condition, if the scavenging air delivered from the supplementary scavenging pump is equally supplied at both the first and the second crankcases 124 and 126, the compression ratio CRso is as follows:

$$CR_{so} = [3 V_{ss} + 1.10 V_{ss} + 0.15 V_{ss}]/[2.25$$
$$V_{ss} + (1.10/2)(1 + \cos 80°) V_{ss} + 0.15 V_{ss}] = 1.39 \quad (11)$$

Next, assuming that the stroke volume of the supplementary scavenging pump is 0.5 $V_s = 2 \times 0.4 V_{ss}$, that the scavenging air delivered from the supplementary scavenging pump is supplied only to the first crankcase 124, that the clearance volume of the first crankcase is 1.3 Vss, that the clearance volume of the supplementary scavenging pump and the first and second passages is, in sum, 0.15 Vss, that the crank angle between the bottom dead center of the supplementary scavenging pump and the scavenging port opening phase point So is 90°, and that the crank angle between the scavenging port opening phase point So and the bottom dead center of the power piston is 60°, the compression ratio CRso is as follows:

$$CR_{so} = [2.3 V_{ss} + 2 \times 0.4 V_{ss} + 0.15 V_{ss}]/[(1.3 + 0.25)$$
$$V_{ss} + (2 \times 0.4/2)(1 + \cos 90°) V_{ss} + 0.15 V_{ss}] = 1.55 \quad (12)$$

As apparent from the above examples, when the clearance volume of the crankcase is smaller, when the stroke volume of the supplementary scavenging pump is larger, and when the crank angle between the bottom dead center of the supplementary scavenging pump and the scavenging port opening phase point So is larger, the pressure of the scavenging air supplied to the power cylinder at the scavenging port opening phase point So becomes higher, and this scavenging pressure is higher when the scavenging air from the supplementary scavenging pump is supplied only to one crankcase than when the scavenging air is supplied from the supplementary scavenging pump to both the crankcases. However, it is to be noted that, if the stroke volume of the supplementary scavenging pump is too much increased, the amount of scavenging air becomes excessive so as to increase blow-out of scavenging air to the exhaust manifold, while requiring greater power for driving the supplementary scavenging pump, with a portion of the power being lost uselessly. Further, if the crank angle between the bottom dead center of the supplementary scavenging pump and the scavenging port opening phase point So is too large, the duration of supply of scavenging air after the bottom dead center of the power piston becomes undesirably small.

By taking the aforementioned various factors and conditions into consideration, in view of the performance required from an engine, a test engine is manufactured, and, in accordance with experiment, various conditions are modified so as to satisfy the requirements with regard to engine performance and with regard to exhaust gas purification. As a result of such experimental researches, we have found that, when the total stroke volume of the supplementary scavenging pump is 0.4–1.1 times as large as the total stroke volume of the power cylinder-piston assembly to which the supplementary scavenging pump supplies scavenging air, when the bottom dead center of the supplementary scavenging pump is in the range between 0°–20° behind a phase point which is 90° in advance of the scavenging port opening phase point So, and when the first passage closing phase point is in the range between the midpoint between the scavenging port opening phase point So and the bottom dead center of the power piston and a phase point at which the supplementary scavenging pump has ¼ of its total stroke remaining before it reaches its top dead center, the engine having the basic structure of the present invention can exhibit its distinguished features with regard to engine performance and exhaust gas purification.

FIGS. 7 and 8 are vertical sectional views in somewhat diagrammatical illustration of an embodiment of the main fuel injection nozzle 500 and an embodiment of the fuming fuel nozzle 600, respectively. Any conventional fuel injection nozzle can be used as the main or the fuming fuel injection nozzle, and the embodiments shown in FIGS. 7 and 8 are of the type which is known as the automatic injection valve type. In the shown embodiments, the fuel injection nozzles 500 and 600 have generally the same structure, except for the hole structure provided at the tip portion of the nozzle, and their capacity. These fuel injection nozzles have housings 502 and 602, respectively, which have cylinder bores 504 and 604 formed therein, in which are slidably received needles 506 and 606, respectively. The housing 502 of the main fuel injection nozzle has two injection ports 508 provided at its tip portion, while on the other hand the housing 602 of the fuming fuel injection nozzle has a sole injection port 608 provided at its tip portion. At the entrances to the injection ports 508 and 608 are formed valve seats 510 and 610, respectively, onto which are urged the tip portions of the needles 506 and 606 under the action of compression coil springs 512 and 612, respectively. At the inlet side of the valve seats 510 and 610 are provided pressure chambers 514 and 614, respectively, which are supplied with fuel from fuel inlet ports 516 and 616 through passages 518 and 618, respectively. The fuel inlet ports 516 and 616 are supplied with pressurized liquid fuel from a fuel injection pump, which is described in detail hereinunder, through fuel pipes 702 and 704, respectively. As described hereinunder, the pressure of the fuel supplied to the fuel inlet port 516 of the main fuel injection nozzle 500 is substantially higher than that of the fuel supplied to the fuel inlet port 616 of the fuming fuel injection nozzle 600, and in accordance with this the strength of the compression coil spring 512 in the fuel injection nozzle 500 is substantially higher than the strength of the compression coil spring 612 in the fuel injection nozzle 600. 508 and 618 designate fuel release ports of the fuel injection nozzles 500 and 600, respectively, and 520 and 620 designate fuel filters provided in the fuel inlet ports 516 and 616, respectively.

When fuel oil having a pressure higher than a predetermined level is supplied to the pressure chamber 514 or 614 of the fuel injection nozzle 500 or 600, the needle 506 or 606 is pushed upwards in the figure against the action of the compression coil spring 512 or 612 so as to open the valve seat 510 or 610, so that fuel is injected from the pressure chamber 514 or 614 through the injection port 508 or 608.

Figure 12:
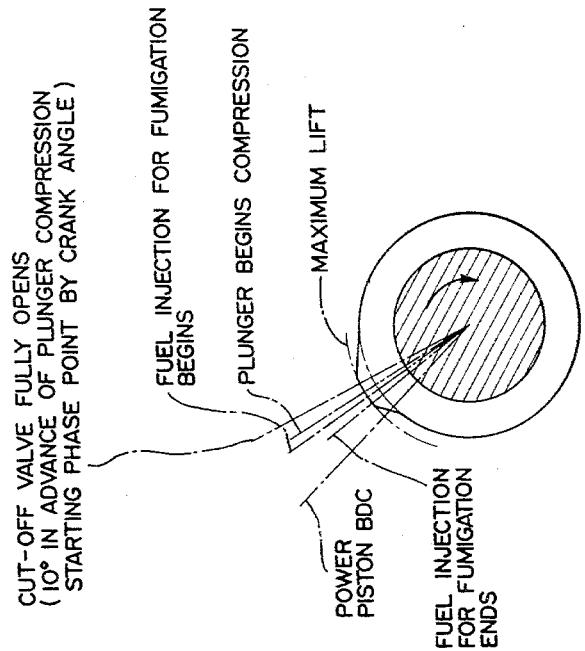
FIGS. 12 and 13 are cam contour diagrams of the two cams incorporated in the fuel injection pump shown in FIG. 9, corresponding to the views observed along arrows XII—XII and XIII—XIII in FIG. 9, respectively.
Figure 13:
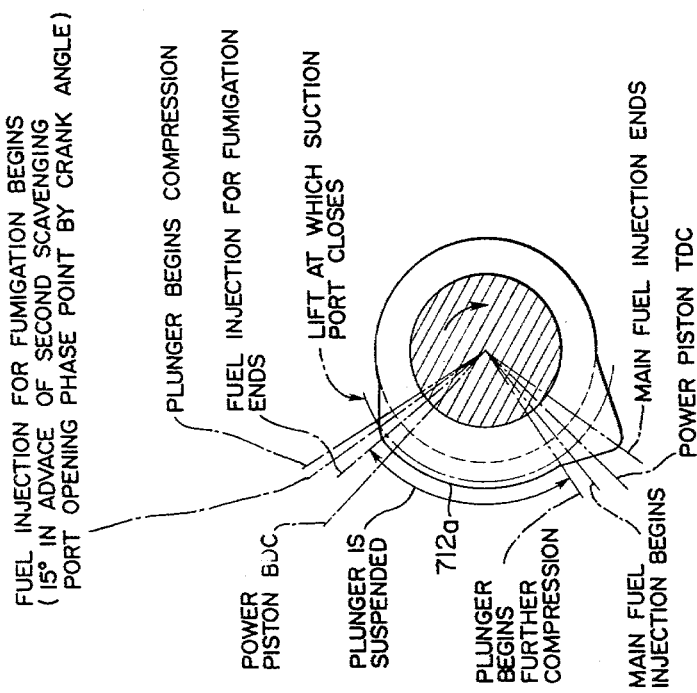

Next, the fuel injection pump 700 will be described, with reference to FIGS. 9–14. In these figures, 710 designates a camshaft which is driven at a rotational speed half that of the crankshaft 12 or 14 of the engine as shown in FIG. 1. This camshaft has cams 712 and 714 having cam contours such as shown in FIGS. 12 and 13, respectively. The cam 712 drives a cam follower 716 upwards in the figure against the action of a compression coil spring 718. The cam follower 716 has a flange portion 716a, in which is engaged a flange portion 720a, formed at the lower end of a plunger 720, so as to be rotatable around its central axis. The plunger 720 is slidably engaged in a sleeve 722 which forms a pump cylinder relative to the plunger 720, said pump cylinder providing a pump chamber 724 at its upper portion. First and second ports 726a and 726b are formed in the sleeve 722, these ports being supplied with fuel through a fuel pipe 728. In an upper portion of the plunger 720 is formed a groove 730 which co-operates with the ports 726a and 726b so as to control the delivery amount of fuel. The groove 730 is adapted to communicate the pump chamber 724 to the port 726b at various shift positions in accordance with rotation of the plunger 720 around its axis, so that delivery amount of the pump is varied in accordance with the rotational position of the plunger 720. For this purpose the plunger 720 is adapted to be properly rotated around its axis by a control mechanism which comprises a plate element 732 mounted at a lower portion of the plunger 720, a sleeve 734 which engages said plate element at its notched portion 734a, a pinion 736 mounted at an upper portion of the sleeve 734, and a rack 738 which drives the pinion 736. The rack 738 is connected with an accelerating mechanism, such as an accelerator pedal, not shown in the figure.

FIGS. 11a–11e show various engaging conditions between the sleeve 722 and the plunger 720. In FIG. 11a the plunger 720 and the sleeve 722 are shown in the condition at the beginning of delivery stroke in full load operation, in FIG. 11b they are shown in the condition at the end of the delivery stroke, in FIG. 11c they are shown in the condition at the beginning of delivery stroke in partial load operation, in FIG. 11d they are shown in the condition close to the end of delivery stroke in partial load operation, and in FIG. 11e they are shown in no-delivery condition.

The fuel discharged from the pump chamber 724 upward in the figure by upward movement of the plunger 720 flows into a delivery chamber 744 by shifting a retraction delivery valve 740 upwards against the action of a spring 742, wherefrom the fuel is supplied to the main injection nozzle 500 through a passage 746 and the fuel pipe 702.

The structure of a fuel injection pump of the jerk pump type as shown in the figure, which comprises the grooved plunger 720 and the pump sleeve 722, and which is adapted to vary delivery amount by varying rotational position of the plunger 720, is itself known as a fuel injection pump of the Bosch type.

The fuel injection pump 700 to be employed in the engine of the present invention further comprises a valve structure for controlling supply of fuming fuel, which is adapted to be operated by the aforementioned cam 714, in addition to the conventional structure of the Bosch type fuel injection pump. In more detail, a branch passage 748 is branched from the delivery chamber 744 to divert a part of the fuel therefrom and to supply this fuel to a pump chamber 752 defined at an upper portion of a bore 750 formed in a part of the pump housing 700a. In the bore 750 is engaged a rod 756 connected with a cam follower 754 adapted to be driven by the cam 714. An upper portion of the rod 756 is formed as a reduced portion 756a, around which is formed the aforementioned pump chamber 752. When the rod 756 is driven upward by the cam 714, it drives at its upper end a spool-like cutoff valve 758, against the action of a compression coil spring 760, upward in the figure, so as to make a space between the lower end of the cutoff valve 758 and the valve seat portion 762 on which the cutoff valve is normally seated, and so as to allow fuel to flow from the pump chamber 752 to an annular space 764a formed between a valve chamber 764 and the spool-like cutoff valve 758. The fuel introduced into the annular space 764a further flows through a T-shaped passage 758a formed in the spool-like cutoff valve 758 upward in the figure so as to flow into the upper main portion of the valve chamber 764, wherefrom the fuel is supplied to the fuming fuel injection nozzle 600 through a passage 766 and the fuel pipe 704.

Figure 14:
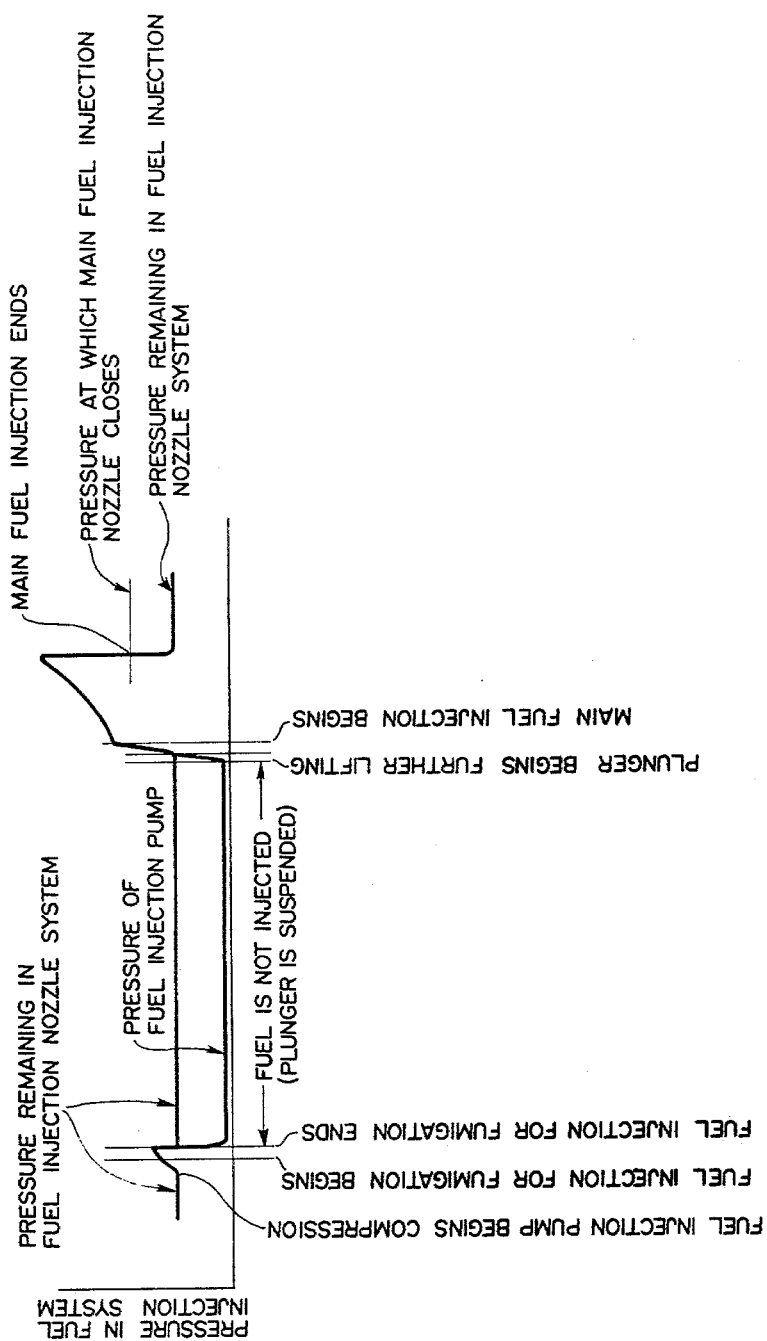
FIG. 14 is a fuel pressure diagram showing the operations of the main fuel injection nozzle and the fuming fuel injection nozzle shown in FIGS. 7 and 8, respectively.

When the plunger 720 is shifted up by a lift amount which corresponds to the intake port closing lift in the cam 712 shown in FIG. 12 in accordance with rotation of the camshaft 710, the plunger 720 just closes the ports 726a and 726b. At this time point the plunger begins compression. In parallel with this the cam 714 pushes up the rod 756 by its cam lobe shown in FIG. 13 so as to open the cutoff valve 758. Therefore, when the plunger 720 is driven upward beyond the inlet port closing lift, the fuel delivered from the pump chamber 724 is driven through the branch passage 748 so as to be conducted through the cutoff valve 758 and the fuel pipe 704 and to be supplied to the fuming fuel injection nozzle 600. When the fuel pressure in the fuming fuel injection nozzle rises up to its opening pressure as shown in FIG. 14, the fuel injection nozzle injects fuel, i.e. fuming fuel, into the fume generating chamber 154a.

Referring again to FIG. 12, when the cam lift reaches a constant level (712a) after a subsequent rising process the plunger 720 stops its rising, thereby delivery of fuel is interrupted by the retraction delivery valve 740, so that injection of fuming fuel is stopped. This constant cam lift portion of the cam 712 continues until power piston TDC is approached. On the other hand, the cam lift in the cam 714 returns to zero so that the cutoff valve 758 is closed by the compression coil spring 760 after the injection of fuming fuel has been stopped.

The cam lift of the cam 712 again increases at a position slightly in advance of power piston TDC so as to further push up the plunger 720. Then the retraction delivery valve 740 is pushed up to open by compressed fuel and the fuel delivered from the pump chamber 724 is at this time conducted through the passage 746 and the fuel pipe 702 towards the main fuel injection nozzle 500. When the fuel pressure increases beyond the opening pressure of the main fuel injection nozzle, the nozzle is opened, and main fuel injection is effected in a manner as shown in FIG. 14. Since the cutoff valve 758 is closed at this time, fuel is not supplied toward the fuming fuel injection nozzle 600. When the cam lift of the cam 712 reaches its highest point, fuel pressure abruptly lowers, so that the retraction delivery valve 740 is closed, and therefore fuel injection from the main fuel injection nozzle is stopped at this moment. As the cam 712 further rotates, the cam lift returns to zero, and in accordance with this the plunger 720 is returned to its lowermost position by the compression coil spring 718. During this return process the pump chamber 724 is filled with fuel so as to be ready for the next injection.

With respect to the injection timing of fuming fuel, it is desirable that fume should be supplied immediately from the second scavenging port opening phase point So' as seen in FIG. 5, and that injection of principal fume should end approximately at the first passage closing start limit phase point Pci also as seen in FIG. 5. Although a small amount of fume is further supplied after the end of the supply of the principal fume, this trailing fume is positioned substantially remote from the layer of exhaust gases in the power cylinder, and therefore this trailing fume has less chance of being effectively heated by the exhaust gases. If there is a substantial distance between the fume generating chamber 154a and the second scavenging ports 128B, air will be discharged from the second scavenging ports for a while after their opening, which remains in the space between the fume generating chamber and the second scavenging ports at the end of the preceding cycle. In this case, therefore, a small lapse of time is required before fume is supplied after the opening of the second scavenging ports. If fume should be supplied immediately when the second scavenging ports are opened, the fuming fuel injection nozzle 600 must inject fuel about 15° by crank angle in advance of the second scavenging port opening phase point. It is desirable that the amount of fuming fuel should be 8 to 20% of the total amount of fuel supplied to the power cylinder. However, it is to be noted that the amount of fuming fuel should be substantially constant regardless of engine load. Since fuel injection period is about 30° by crank angle in conventional diesel engines, fuming fuel injection period is to be very small in order to maintain the abovementioned ratio. It is desirable that the amount of air which forms fume should be 10-25% of the total amount of scavenging air. The volume of the fume generating chamber 154a and opening area of the passages 152 and 154, and first, second, and third scavenging ports 128A, 128B, and 128C are adjusted so as to satisfy the abovementioned conditions.

Figure 15:
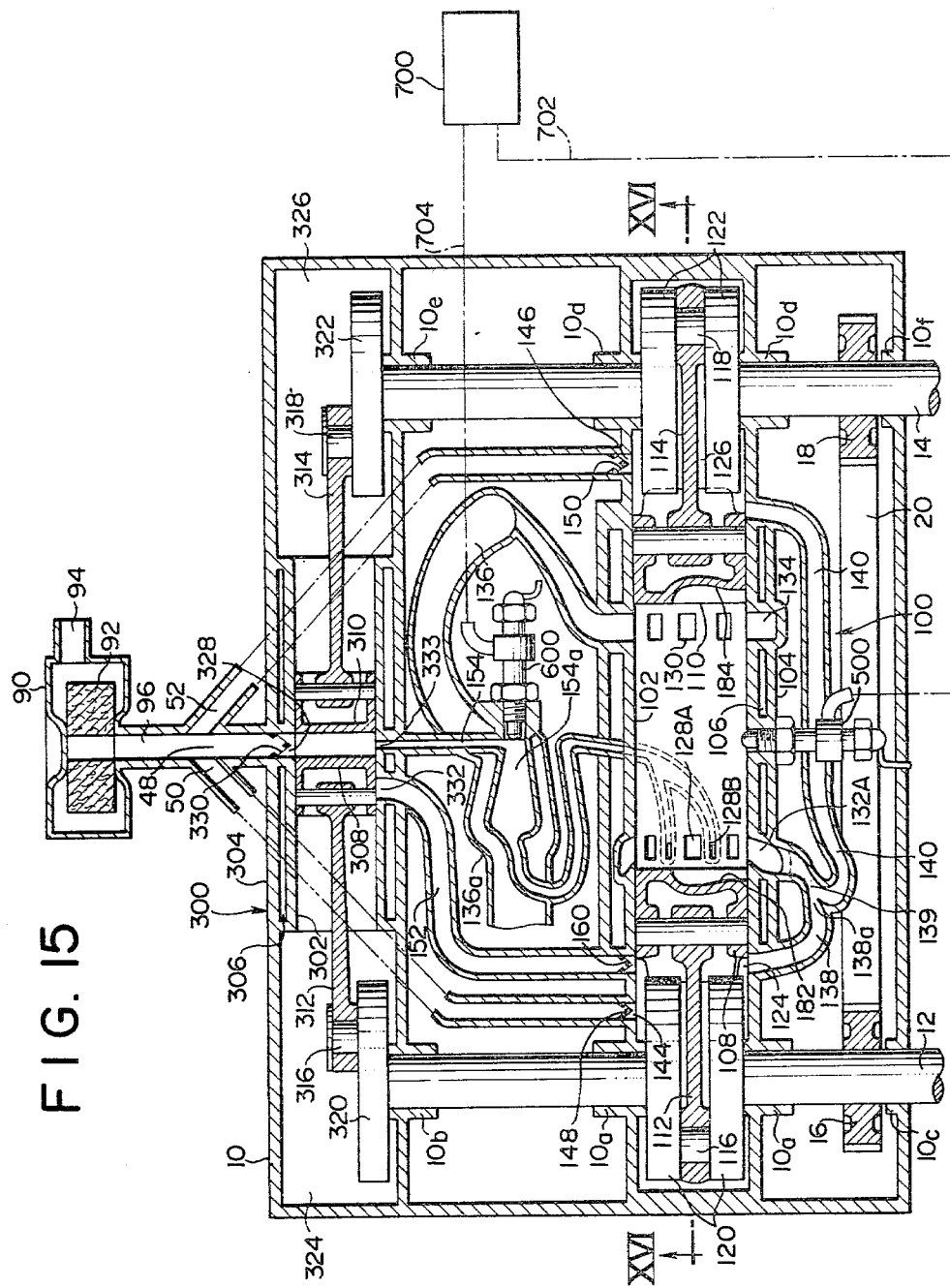
FIG. 15 is a diagrammatical plan sectional view showing a second embodiment of the two-stroke cycle diesel engine of the present invention.
Figure 16:
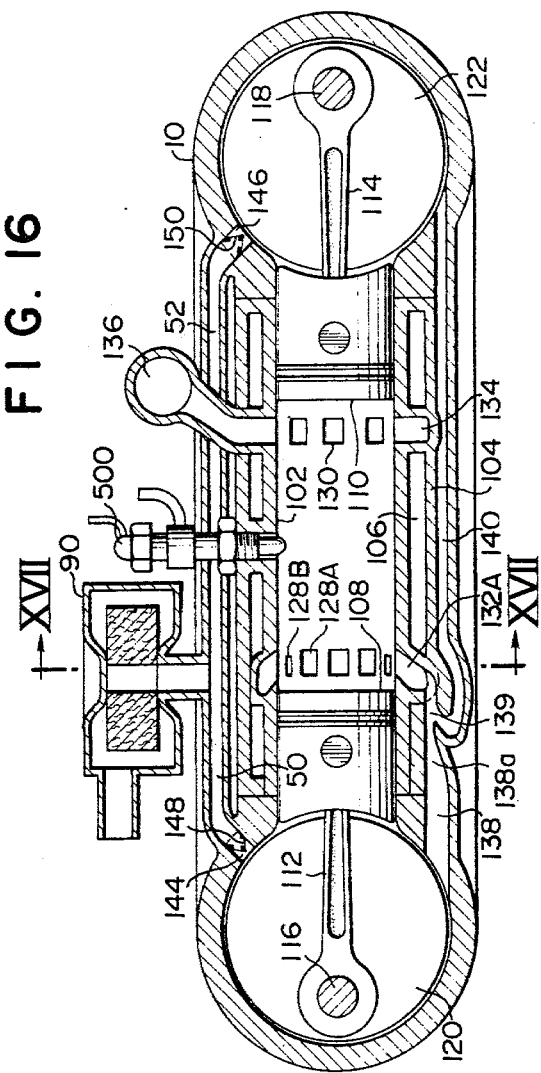
FIG. 16 is a sectional view along line XVI—XVI in FIG. 15.
Figure 17:
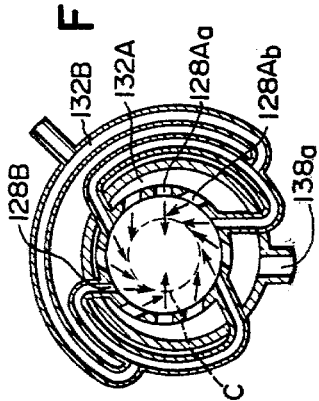
FIG. 17 is a sectional view along line XVII—XVII in FIG. 16.

FIG. 15 is a diagrammatical plan sectional view showing a second embodiment of the engine of the present invention; FIG. 16 is a sectional view along line XVI—XVI in FIG. 15; and FIG. 17 is a sectional view along line XVII—XVII in FIG. 16. This second embodiment is different from the first embodiment shown in FIGS. 1–4 with regard to the structure of the scavenging port and the scavenging plenum. Therefore, the portions in FIGS. 15-17 which correspond to those shown in FIGS. 1–4 are designated by the same reference numerals as in FIGS. 1–4. Instead of the first and third scavenging ports 128A and 128C in the first embodiment, in this second embodiment only one group of scavenging ports 128A are provided. Corresponding to this modification the two scavenging plenums 132A and 132C in the first embodiment are replaced by a single scavenging plenum 132A in this second embodiment. The structure for supplying scavenging air to this single scavenging plenum includes a jet portion 138a formed adjacent to the scavenging plenum 132A at a portion of the passage 138 which conducts scavenging air from the first crankcase 124 to the scavenging plenum, and the passage 140 which conducts scavenging air from the second crankcase 126 to the scavenging plenum is connected to the passage 138 at the jet portion 138a. In this case, as seen in FIG. 15, the angle formed between the passages 138 and 140 at the upstream side of their joining point is an acute angle so that the flow of scavenging air ejected from the passage 140 toward the jet portion 138a has a velocity component directed toward the scavenging plenum 132A.

As seen in FIG. 6, it is slightly before the scavenging port opening phase point So that the pressure in the first crankcase 124 becomes substantially higher than that in the second crankcase 126. Therefore, it is slightly before the scavenging opening phase point So that the pressures of the scavenging air in the passages 138 and 140, both having increased at the same rate, break their balance at the joining point 139 so that the pressure of the scavenging air in the passage 138 becomes higher than that of the scavenging air in the passage 140. Therefore, since the scavenging ports 128A are opened soon after the balance between the pressures in the passages 138 and 140 has been broken, the joining point 139 is soon traversed by the strong flow of scavenging air generated in the jet portion 138a to flow toward the scavenging plenum 132A, thereby substantially suppressing flow of scavenging air from the passage 138 to the passage 140 past the joining point, thereby obviating the danger of causing reverse flow of scavenging air through the passage 140 towards the second crankcase 126. However, even if a slight reverse flow of scavenging air occurs, it does not cause any problem. Thus, the pressure in the first crankcase 124 is effectively increased by the scavenging air supplied from the supplementary scavenging pump 300, so that when the scavenging ports 128A are opened a large amount of scavenging air at a high pressure is supplied through passage 138 towards the scavenging ports. In this case, due to a slight throttling action effected by the jet portion 138a, the scavenging air from the passage 138 tends all to go to the plenum 132A to result in that pressure is built up in the scavenging plenum 132A. As a result, flow of scavenging air through the passage 140 is suppressed. On the other hand, the air in the second crankcase 126 is further compressed as the power piston moves towards its bottom dead center so that the pressure in the second crankcase increases as seen in FIG. 6. Thus, when the pressure in the second crankcase has sufficiently increased, and when the velocity of air in the jet portion 138a has increased to a certain level, supply of scavenging air from the passage 140 to the scavenging plenum 132A begins. This turning point is shown by So" in FIG. 6. Thereafter, as the flow velocity in the jet portion 138a increases, suction is applied to the passage 140 by the jet portion 138a so as to expedite supply of scavenging air through the passage 140.

Other structures and functions with regard to the second embodiment shown in FIGS. 15-17 are the same as those in the first embodiment shown in FIGS. 1-4, and therefore descriptions of these common structures and functions will be omitted in order to avoid duplication.

Figure 18:
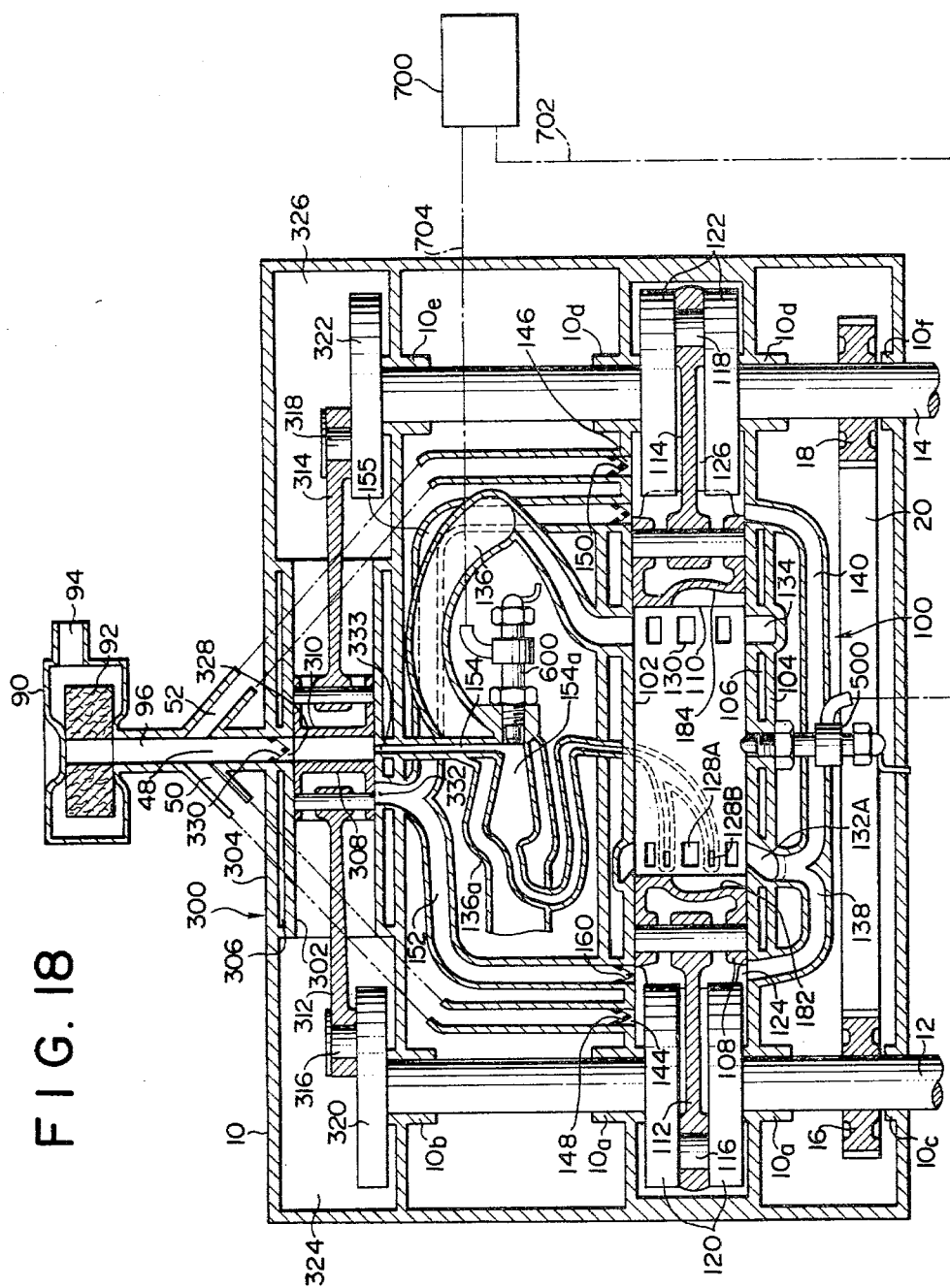
FIG. 18 is a diagrammatical plan sectional view showing a third embodiment of the two-stroke cycle diesel engine of the present invention.
Figure 19:
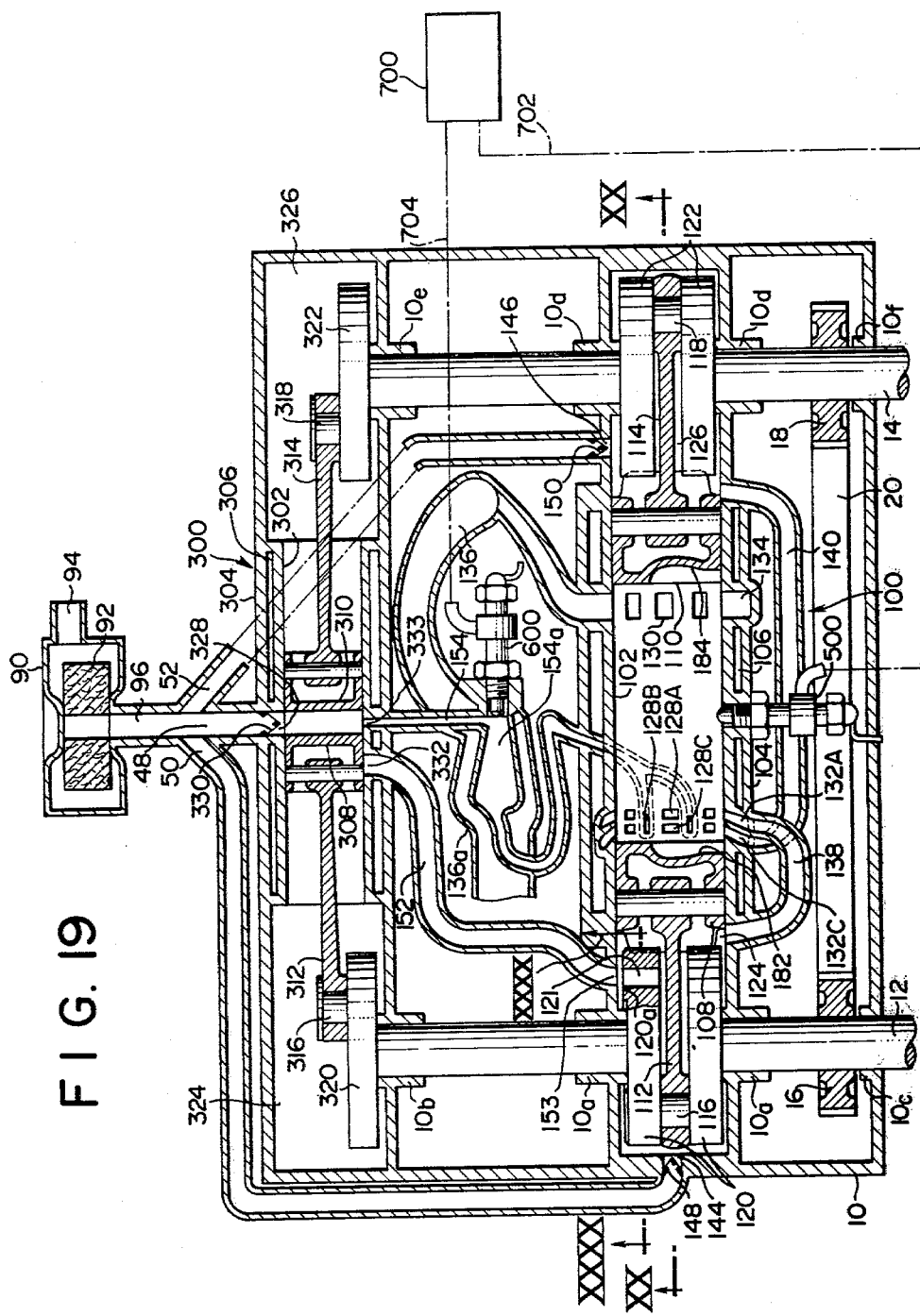
FIG. 19 is a diagrammatical plan sectional view showing a fourth embodiment of the two-stroke cycle diesel engine of the present invention.

FIG. 18 is a diagrammatical plan sectional view showing a third embodiment of the engine of the present invention. With regard to the structure of the scavenging ports this third embodiment has the same structure as the second embodiment shown in FIGS. 15-17. However, in this third embodiment the scavenging air delivered from the first delivery port 332 of the supplementary scavenging pump 300 is supplied to both the first and the second crankcases 124 and 126 through passages 152 and 155. As described in connection with several examples of calculation with regard to scavenging pressure, when the scavenging air from the supplementary scavenging pump is supplied to both the first and the second crankcases, the scavenging pressure lowers when compared with the case where the scavenging air from the supplementary scavenging pump is supplied to only the first crankcase under the same operating conditions. Therefore, when there is no margin with respect to the stroke volume of the supplementary scavenging pump, it is desirable that the air from the supplementary scavenging pump should be supplied to only the first crankcase, as in the first and second embodiments, so as more to increase the scavenging pressure. On the other hand, when there is a margin with respect to the stroke volume of the supplementary scavenging pump, the air from the supplementary scavenging pump may be supplied to both the first and the second crankcases so that the scavenging air from the second crankcase is supplied to the power cylinder over a relatively long duration. Further, in this case the amount of air which remains to be inactive in the second crankcase is reduced so as to increase the effectiveness of the second crankcase. when the scavenging air from the supplementary scavenging pump is supplied to both the first and second crankcases, as in this third embodiment, it is not required that the joining point of the passages 138 and 140 conducting air from the first and second crankcases should be constructed in a particular joining structure such as the one incorporated in the second embodiment shown in FIGS. 15-17 which includes a jet structure. Therefore, in FIG. 18 the passages 138 and 140 are joined in an ordinary joining structure.

Other structures and functions with regard to the third embodiment shown in FIG. 18 are the same as those in the first embodiment shown in FIGS. 1-4 and in the second embodiment shown in FIGS. 15-17, and therefore descriptions of these common structures and functions will be omitted in order to avoid duplication.

Figure 23:
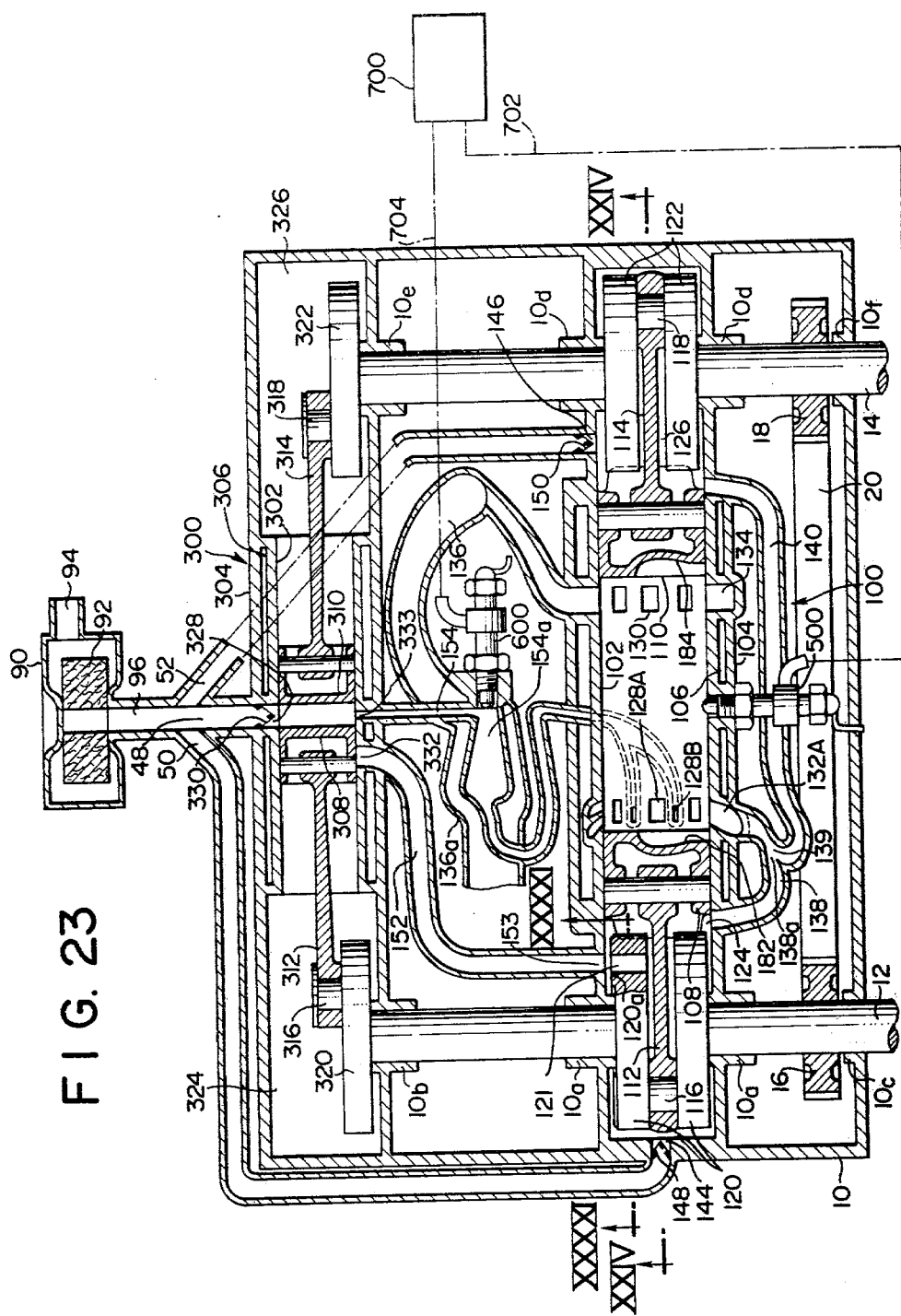
FIG. 23 is a diagrammatical plan sectional view showing a fifth embodiment of the two-stroke cycle diesel engine of the present invention.
Figure 24:
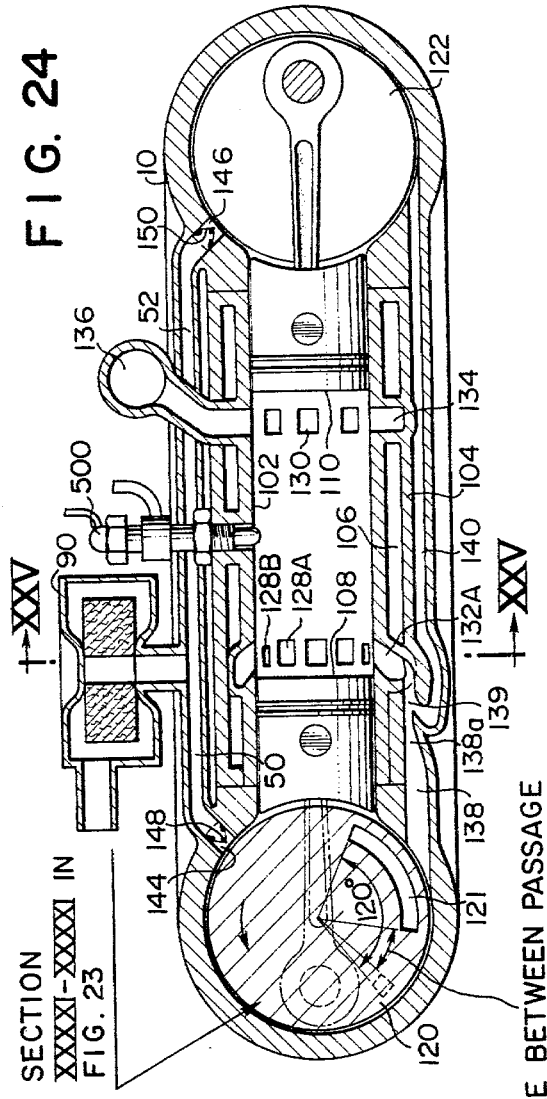
FIG. 24 is principally a sectional view along linge XXIV—XXIV in FIG. 23, wherein a sectional view along line XXXXI—XXXXI in FIG. 23 is partially incorporated.
Figure 25:
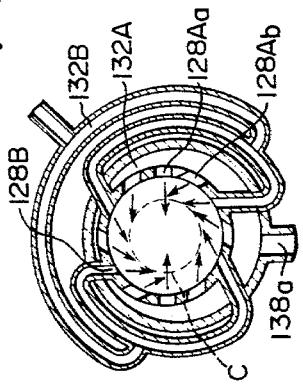
FIG. 25 is a sectional view along line XXV—XXV in FIG. 24.

In the first embodiment shown in FIGS. 1-4, in the second embodiment shown in FIGS. 15-17, and in the third embodiment shown in FIG. 18, the reed valve 160 provided in the first passage 152 is actually relatively large and involves the problem that the clearance volume of the first passage becomes relatively large. This problem is particularly serious in a small-sized engine. In view of this, it is proposed to abolish the reed valve 160 and to incorporate a valve structure in the crank portion which comprises an opening formed in the wall of the crankcase 124 and a valve element incorporated in the crankcase 120 which selectively closes the opening in accordance with the rotation of the crank arm so as to isolate the connection between the first passage connected to said opening and the crankcase 124 over the phase period in which reverse flow of air from the crankcase 124 to the first passage 152 would occur. The fourth embodiment shown in FIGS. 19-22 and the fifth embodiment shown in FIGS. 23-25 are embodiments which incorporate such a valve structure controlled by the crank arm. The fourth embodiment shown in FIGS. 19-22 is an embodiment obtained by incorporating the aforementioned valve structure in the first embodiment shown in FIGS. 1-4. Similarly, the fifth embodiment shown in FIGS. 23-25 is obtained by incorporating the aforementioned valve structure in the second embodiment shown in FIGS. 15-17. In FIGS. 19-22 and in FIGS. 23-25 the portions corresponding to those shown in FIGS. 1-4 and in FIGS. 15-17 are designated by the same reference numerals.

Figure 26:
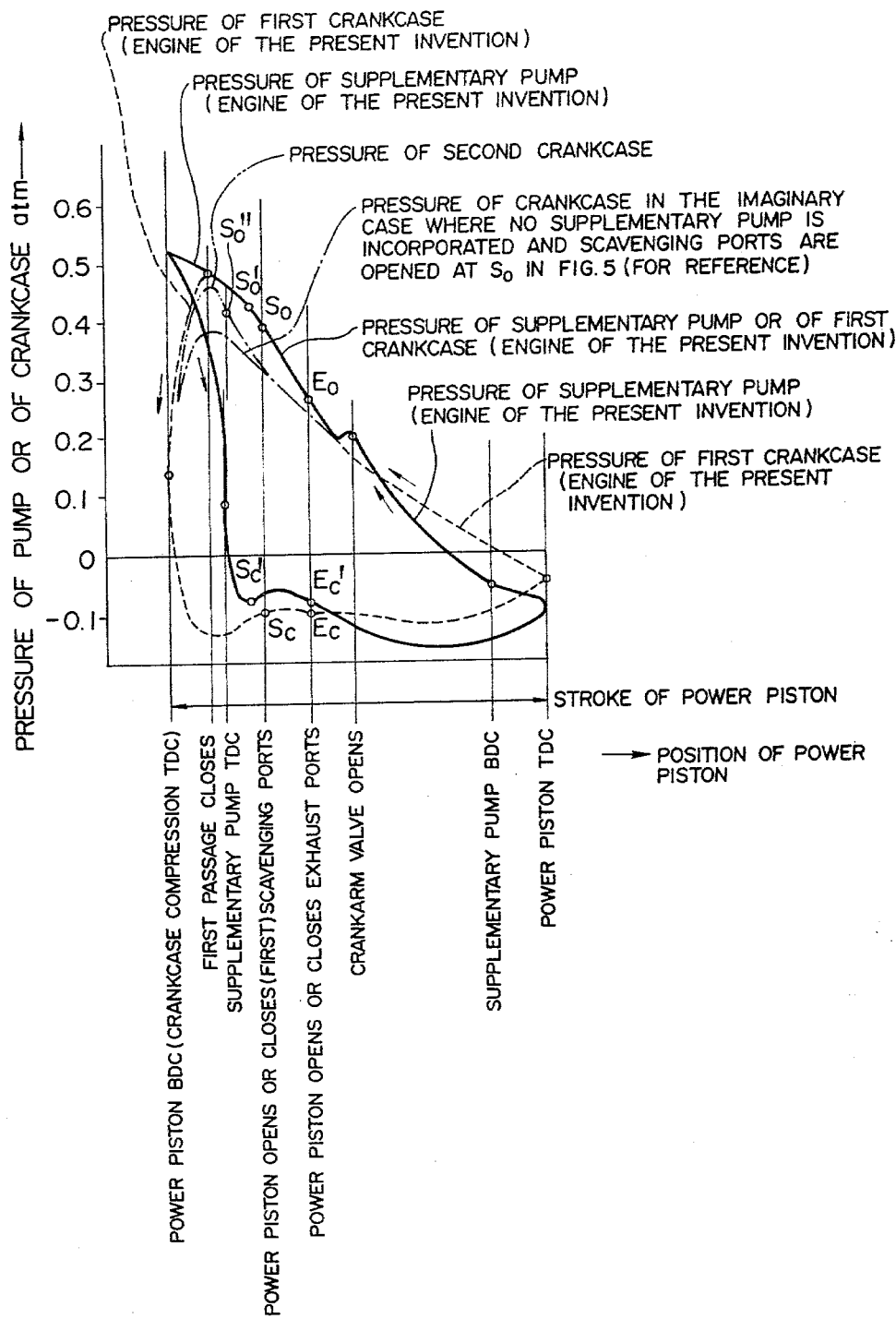
FIG. 26 is an indicator diagram similar to FIG. 6, showing the pressures of the supplementary scavenging pump and the crankcase compression relative to the position of the power piston in a two-stroke cycle diesel engine of the present invention, in particular in the fourth and fifth embodiments shown in FIGS. 19-25.

Referring to FIGS. 19-25 showing the fourth and fifth embodiments, one of the crank arms 120 is formed with an annular land portion 120a which faces a port 153 formed in the wall of the first crankcase 124 and connected with the first passage 152, and an arcuate opening 121 is formed through the thickness of the crank arm disk so as to open the port 153 to the crankcase over a certain phase range during rotation of the crank arm. It is sufficient if the opening 121 is so formed that it opens the port 153 from a phase point which is 60° in advance of the scavenging port opening phase point So. This is due to the fact that, as seen in FIG. 26 which shows the relation between the pressure of the supplementary scavenging pump or the pressure in the crankcase and the position of the power piston with regard to the fourth and fifth embodiments, the pressure of the supplementary scavenging pump is not substantially higher than the pressure in the first crankcase before the aforementioned phase point, making it useless to open the port 153 before the aforementioned phase point. Therefore, when the scavenging port opening phase point is 60° in advance of power piston BDC, the opening 121 should be formed so as to overlap the port 153 from a phase point which is 120° in advance of power piston BDC. The aforementioned 60° may be reduced in some designs. However, if this angle is much smaller than 60°, there occurs a problem that in high speed operation of the engine the flow of scavenging air is delayed so that the pressure in the first crankcase is not sufficiently increased by the scavenging air from the supplementary scavenging pump when the scavenging ports are opened at the phase point So.

The sectional views XXXX—XXXX and XXXXI—XXXXI in FIGS. 20 and 24 show the valve structures in the state where the power pistons are at their bottom dead center. Therefore, the angle "theta" in these figures gives the phase point at which the port 152 is closed by the land portion 120a, i.e., this angle corresponds to the crank angle between the first passage closing phase point and the bottom dead center of the power piston. Therefore, when this angle is selected to be equal to the angle between the first passage closing phase point selected from between the start limit Pci and the end limit Pce with regard to the closing of the first passage and the bottom dead center of the power piston, as viewed in the crank angle diagram, this slide valve mechanism can also be employed as a control mechanism for closing the first passage. In this case, the first delivery port 332 of the supplementary scavenging pump 300 may be provided at the same position as the second delivery port 333. Since in this system no pressure drop such as caused by the reed valve 160 is involved when the port 153 is opened through the opening 121, the pressure of the supplementary scavenging pump and the pressure in the first crankcase are substantially the same in this open phase region, as seen in FIG. 26. In this connection, it is to be noted that, if the closing of the first passage 152 at a phase point such as some tens of degrees in advance of the bottom dead center of the power piston is controlled by the position of the first delivery port 332, the valving function of the annular land portion 120a, which is to close the port 153 unless the arcuate opening 121 aligns with the port 153, is only to avoid reverse flow of air being caused from the crankcase towards the pumping chamber of the supplementary scavenging pump in a phase region in the vicinity of the top dead center of the power piston and of the bottom dead center of the supplementary scavenging pump wherein the crankcase begins to perform its compression stroke while the supplementary scavenging pump is still performing its suction stroke, and therefore that it is not required that the annular land portion 120a should perfectly close the port 153 when the arcuate opening 121 is not in alignment with the port 153. In other words, the port closing function applied by the land portion 120a to the port 153 need only be of such an extent as to be sufficient in view of the aforementioned object.

Other structures and functions with regard to the fourth embodiment shown in FIGS. 19–22 are the same as those in the first embodiment shown in FIGS. 1–4. Similarly, other structures and functions with regard to the fifth embodiment shown in FIGS. 23–25 are the same as those in the second embodiment shown in FIGS. 15–17. Therefore, detailed descriptions of these common structures and functions will be omitted in order to avoid duplication.

Figure 27:
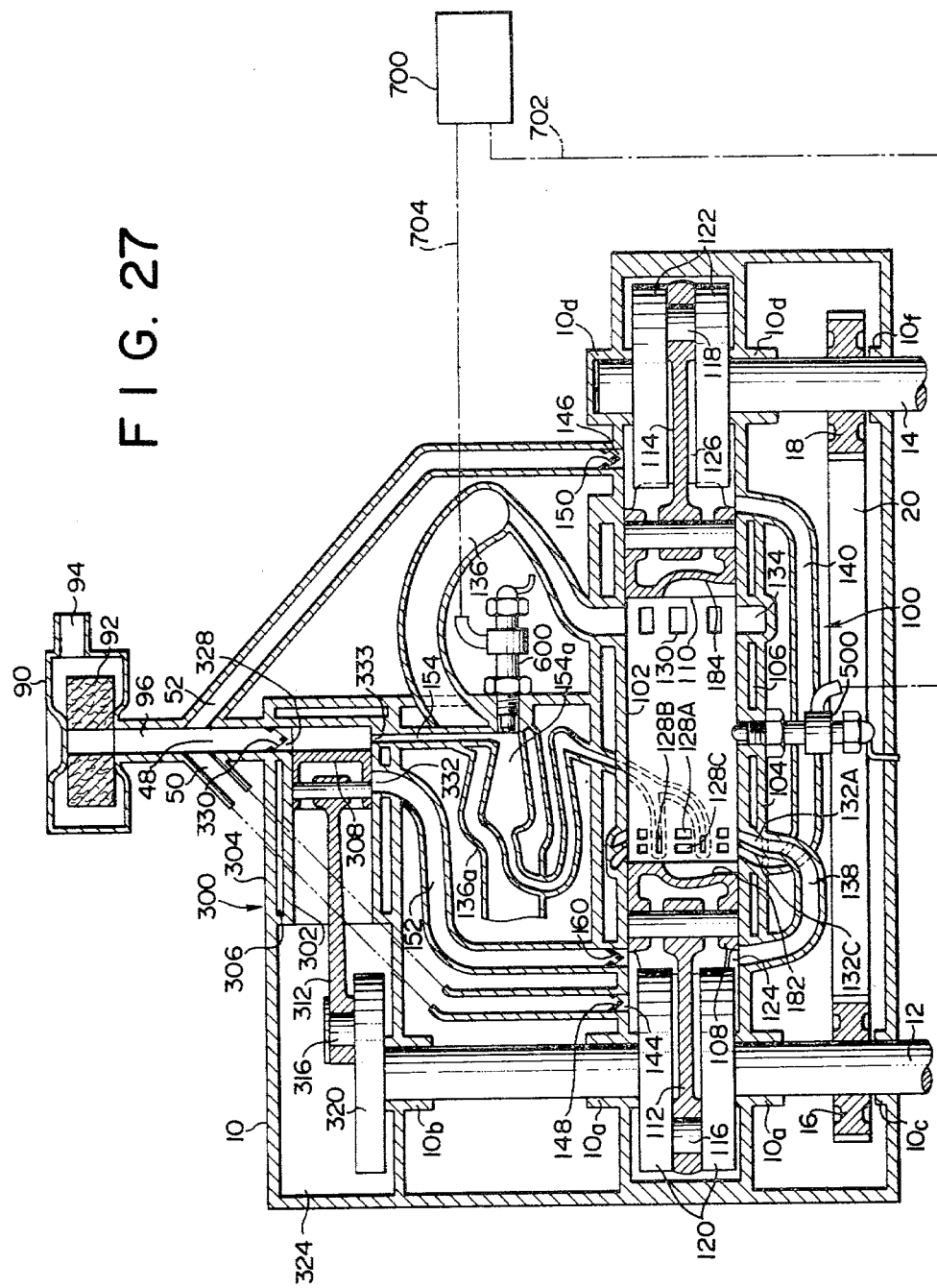
FIG. 27 is a diagrammatical plan sectional view showing a sixth embodiment of the two-stroke cycle diesel engine of the present invention, which is a modification of the embodiment shown in FIG. 1.

FIG. 27 is a diagrammatical plan sectional view similar to FIG. 1, showing a sixth embodiment of the present invention. In this embodiment the pump 300 is constructed as a single piston reciprocating type pump cylinder-piston assembly, and corresponds to the left half portion of the pump 300 shown in FIG. 1, wherein the right half pumping structure including substantially a half of the pump cylinder 302, piston 310, connecting rod 314, crankpin 318 and crank arm 322 is deleted. In FIG. 27, the portions corresponding to those shown in FIG. 1 are designated by the same reference numerals, and these corresponding portions operate in the same manner in both embodiments. When such a single piston pump assembly is employed, there are disadvantages with regard to the dimensions of the pump piston relative to the power piston and with regard to dynamic balance of the pump assembly when compared with a pump assembly of the horizontally opposed piston type, as described hereinabove. However, in this case the manufactuing cost is reduced, and when the engine is small-sized, the balance and dimensional disadvantages can be sufficiently compensated for by the cost advantage.

Since the structure and operation of other portions of the embodiment shown in FIG. 27 are substantially the same as those of the embodiment shown in FIG. 1, detailed descriptions of those will be omitted in order to avoid duplication. A similar modification is also applicable to the embodiment shown in FIG. 15.

Figure 28:
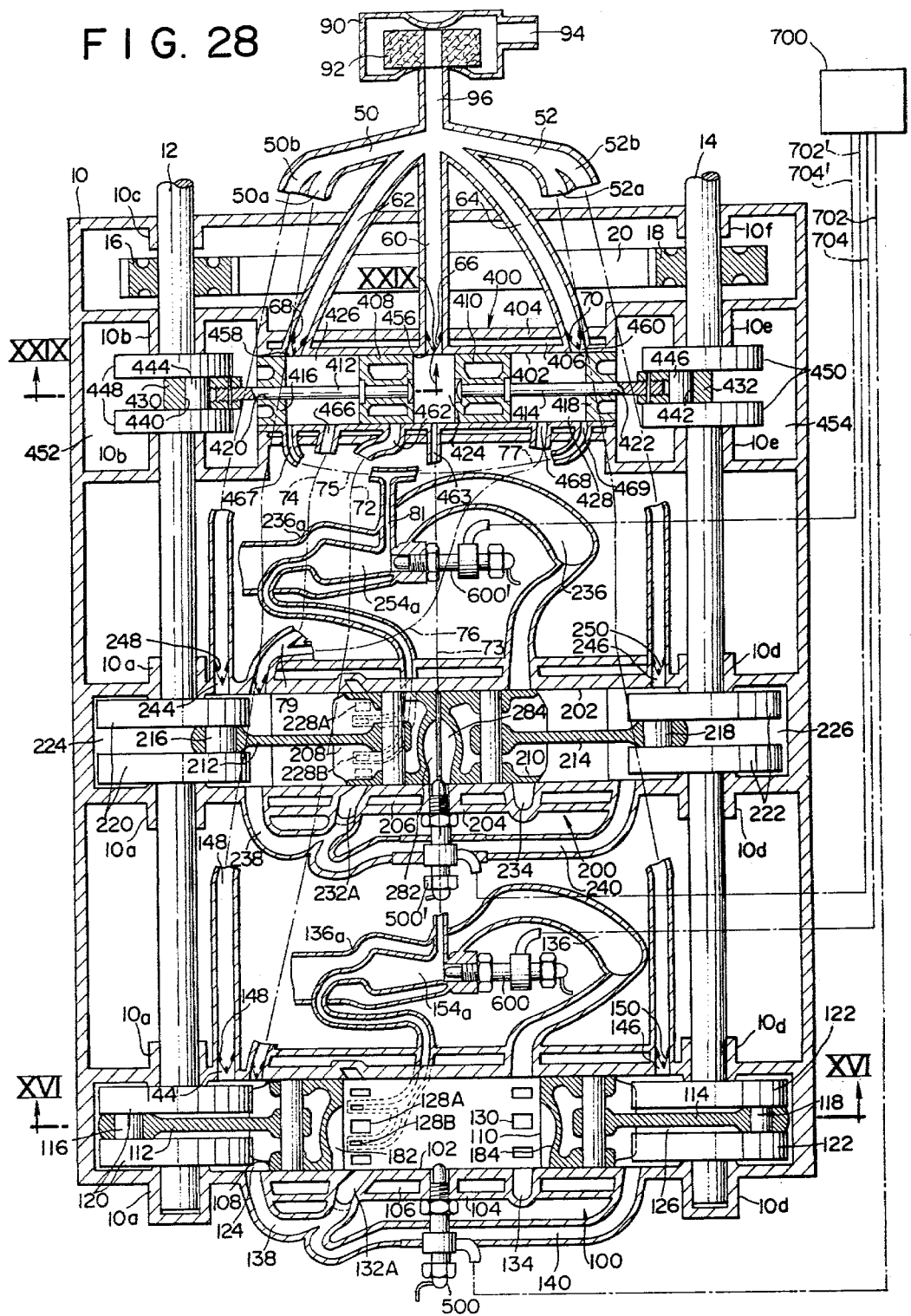
FIG. 28 is a diagrammatical plan sectional view showing a seventh embodiment of the two-stroke cycle diesel engine of the present invention.

FIG. 28 is a diagrammatical plan sectional view of a seventh embodiment, and FIG. 29 is a sectional view along line XXIX—XXIX in FIG. 28. This seventh embodiment includes, in addition to the power cylinder—piston assembly 100 having two horizontally opposed pistons and incorporating uniflow scavenging of the same structure as that of the second embodiment shown in FIGS. 15–17, a second power cylinder-piston assembly 200 of substantially the same structure as the power cylinder-piston assembly 100. In FIG. 20, therefore, the portions of the second power cylinder-piston assembly 200 corresponding to those in the first power cylinder-piston assembly 100 are designated by reference numerals which are the reference numerals attached to the corresponding portions of the first cylinder-piston assembly 100, each increased by 100. However, the main and fuming fuel injection nozzles are designated by 500′ and 600′, respectively. As apparent from FIG. 28, the power pistons 108 and 110 of the first power cylinder-piston assembly 100 and the power pistons 208 and 210 of the second power cylinder-piston assembly 200 are shifted apart by a phase difference of 180°.

In the engine having these two power cylinder-piston assemblies, in order to make the supplementary scavenging pump dimensionally better adapted to the two power cylinder-piston assemblies, and in order to construct the supplementary scavenging pump so as to deliver two charges of scavenging mixture having a phase difference of 180° therebetween so that these two charges of scavenging mixture are individually adapted to the two power cylinder-piston assemblies which operate in synchronization with a phase difference of 180° therebetween, it is desirable that the supplementary scavenging pump should be constructed as a double acting pump cylinder-piston assembly 400 having two horizontally opposed pistons. The pump assembly 400 has a pump cylinder 402 supported by the cylinder block 10 and surrounded by a cooling jacket 406 defined by a jacket wall 404. In the pump cylinder 402 are opposedly provided a pair of disk-like pump pistons 408 and 410 which are individually connected with push rods 412 and 414 which individually extend through openings 420 and 422 formed in end plates 416 and 418 which close opposite ends of the pump cylinder 402. The openings 420 and 422 are individually constructed as bearing openings which slidably and sealingly receive the push rods 412 and 414, respectively. By this arrangement the inside of the pump cylinder 402 is divided into three pump chambers 424, 426, and 428. The other ends of the push rods 412 and 422 are, as better shown in FIG. 29, individually connected with O-members 430 and 432. As shown in FIG. 29 with respect to the connection between the push rod 412 and the O-member 430, the end of the push rod 412 is formed with a threaded portion 436 which is screwed into a correspondingly threaded opening 434 formed in the O-member 430, and the screw engagement is fixed by a pin 438. The O-members 430 and 432 individually have grooves 440 and 442 in which are individually engaged crankpins 444 and 446 which are individually supported by crank arms 448 and 450, each being constructed as a pair of crank arms. The crankcases 452 and 454 housing individually the crank mechanisms constructed by the aforementioned crank arms, etc., are connected with the inside of the air cleaner 90 by way of a positive crankcase ventilation valve not shown in the figure, so as to control pressure fluctuation in the crankcases.

The outlet of the air cleaner 90 is connected with the ports 144 and 244 of the first and second power cylinder-piston assemblies 100 and 200 by a common passage 50 and two branch passages 50a and 50b, respectively, is connected with the ports 146 and 246 of the first and second power cylinder-piston assemblies 100 and 200 by a common passage 52 and two branch passages 52a and 52b, respectively, and is connected with ports 456, 458, and 460, which open to the pump chambers 424, 426, and 428, by way of passages 60, 62, and 64, respectively. In the passages 60, 62, and 64 are provided, as respectively located close to the ports 456, 458, and 460, reed valves 66, 68, and 70. The pump chamber 424 is connected with the crankcase 124 of the first power cylinder-piston assembly 100 by way of a first delivery port 462 and a passage 72 and is also connected with the scavenging ports 128B of the first power cylinder-piston assembly 100 by way of a second delivery port 463 and a passage 73, which includes a fume generating chamber 154a at a middle portion thereof. On the other hand, the pump chambers 426 and 428 are connected with the crankcase 224 of the second power cylinder-piston assembly 200 by way of their first delivery ports 466 and 468 and passages 74 and 76, respectively, and further by a common passage 79 to which the passages 74 and 76 join, and are also connected with the scavenging ports 228B of the second power cylinder-piston assembly 200 by way of their second delivery ports 467 and 469 and passages 75 and 77, respectively, and further by a common passage 81 to which the passages 75 and 77 join, and a fume generating chamber 254a provided at a middle portion of the passage 81. Inlet ports 456, 458, and 460 of the pump 400 and its second delivery ports 463, 467, and 469 are individually so positioned that they positively open individually to the corresponding pump chambers without interfering with the pistons 408 and 410 even when these pistons have come to their BDC or to their TDC with respect to the pump chambers 424, 426, or 428. By contrast, the first delivery port 462 of the pump chamber 424 is so positioned as to be closed by the pump piston 408 at a selected phase point located in advance of its bottom dead center with regard to the pump chamber 424 and between the start limit Pci and the end limit Pce as viewed in the crank angle diagram shown in FIG. 5. Similarly, the first delivery ports 466 and 468 of the pump chambers 426 and 428 are individually so positioned as to be closed by the pump pistons 408 and 410, respectively, at a selected phase point located in advance of its bottom dead center with respect to the pump chambers 426 and 428 and between the start limit Pci and the end limit Pce as viewed in the crank angle diagram shown in FIG. 5.

The section along line XVI—XVI in FIG. 28 shows a structure similar to that shown in FIG. 16.

The ratio of the pumping stroke volume of the pumping chamber 424 to the stroke volume of the power cylinder-piston assembly 100 and the ratio of the sum of the pumping stroke volume of the pumping chambers 426 and 428 to the stroke volume of the power cylinder-piston assembly 200 should be individually determined in the same manner as in the preceding embodiments so as to be in the range of 0.50–1.20, whereby the engine of this embodiment of the present invention can also exhibit high engine performance and can satisfy requirements with regard to the standard for exhaust gas purification in a desirable manner.

Also in this seventh embodiment the operational phases of the individual pumping chambers of the pump 400 should be determined relative to the operational phases of the first and second power assemblies 100 and 200, respectively, in the same manner as explained with reference to the preceding embodiments, so that the bottom dead center of each pumping chamber is, as viewed in the crank angle diagram, positioned in a range between 0° behind and 20° behind the phase point which is 90° in advance of the scavenging port opening phase point So of the power cylinder-piston assembly to which the pumping chamber supplies air.

Although it is desirable that the clearance volume of the pumping chambers 426 and 428 should be as small as possible, if it is so designed, the push rods 412 and 414 will be supported only like a cantilever when the pistons 408 and 410 are at their BDC with respect to the pumping chamber 424, and the structural stability and durability of the push rods and the related mechanisms will be low. Such a problem can be obviated if, for example, the end plates 416 and 418 are thickened or formed like boxes so as to reduce the clearance volume of the pumping chambers 426 and 428. The clearance volume of the pumping chamber 424 can be reduced easier than the clearance volumes of the pumping chambers 426 and 428. By taking this matter into consideration, in the embodiment shown in FIG. 28 the pumping chambers 426 and 428 are connected with the power cylinder-piston assembly 200 by way of relatively short passages, while on the other hand the pumping chamber 424 is connected with the pump cylinder-piston assembly 100 by way of relatively long passages so that the clearance volumes related to the two pumping chambers are well balanced.

In the pump assembly 400 the reciprocating inertia force is relatively larger than its rotary inertia force. However, the reciprocating inertia force is internally cancelled and does not give any external effect.

Figure 30:
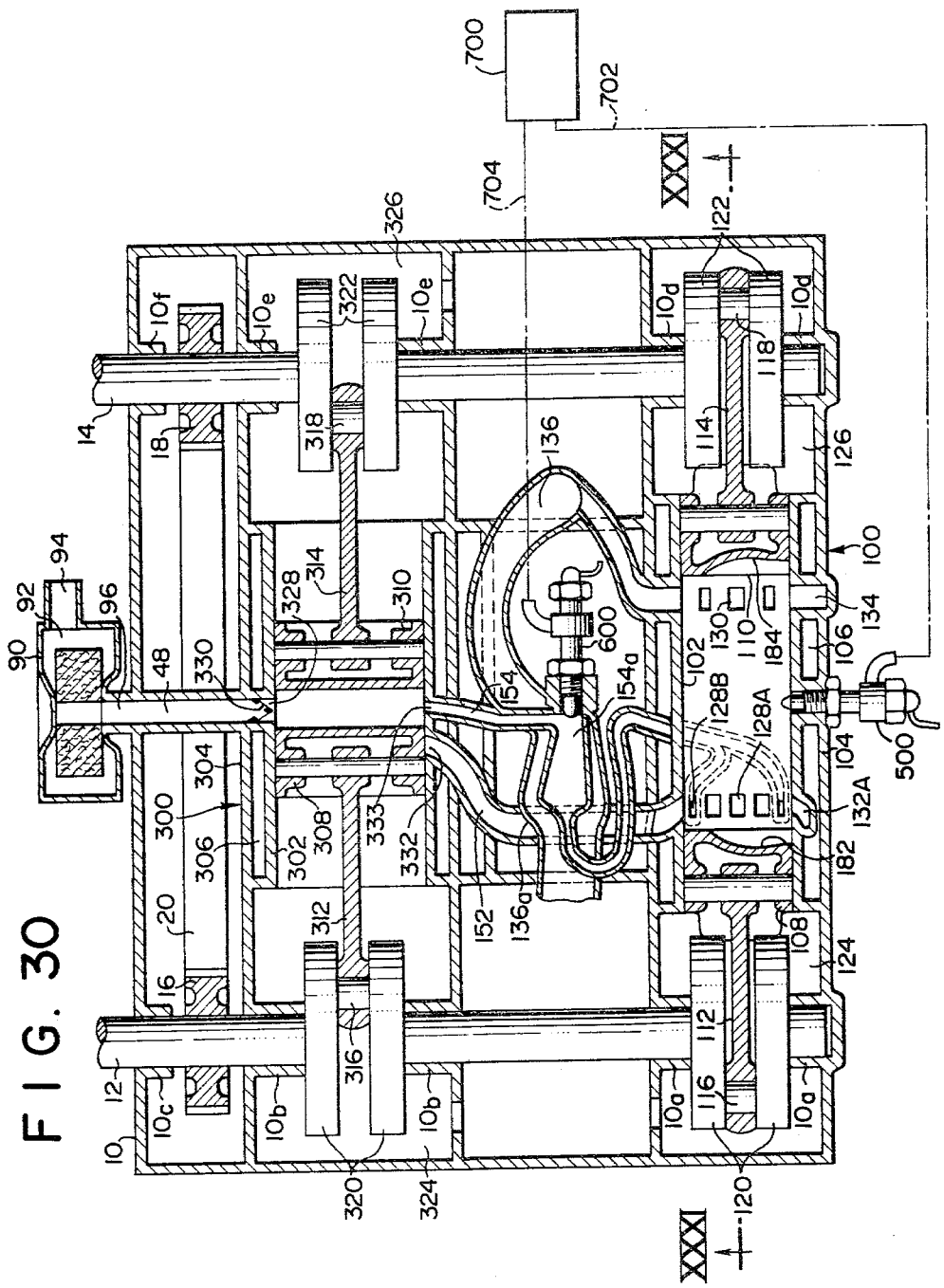
FIG. 30 is a diagrammatical plan sectional view showing an eighth embodiment of the two-stroke cycle diesel engine of the present invention.

FIG. 30 is a diagrammatical sectional plan view showing an eighth embodiment of the present invention; FIG. 31 is a sectional view along line XXXI—XXXI in FIG. 30; and FIG. 32 is a sectional view along line XXXII—XXXII in FIG. 31. In this embodiment the crankcases 124 and 126 of the power cylinder-piston assembly 100 are not constructed so as to perform crankcase compression, and therefore compression of scavenging air is effected only by an independent horizontally arranged pump cylinder-piston assembly. Therefore, as apparent from FIG. 23, the crank arms 120 and 122 are not formed in a disk shape as in the preceding embodiments, and are formed to provide an eccentric mass system which provides a better balancing to moving masses such as the pistons 108 and 110, connecting rods 112 and 114, crankpins 116 and 118, etc.. In this case the crankcases 124 and 126 are not formed in a cylindrical shape which closely covers the disk-shaped crank arms, because in this case it does not matter what clearance volume is left in the crankcase.

In this embodiment the first delivery port 332 of the pump 300 is directly connected to the scavenging plenum 132A by way of the passage 152. In this case, also, the first scavenging ports 128A which are supplied with scavenging air from the scavenging plenum 132A and the second scavenging ports 128B which are supplied with scavenging air from the scavenging manifold 132B which in turn is supplied with scavenging air from the second delivery port 333 of the pump 300 by way of the passage 154 including a fume generating chamber 154a, are, before the first delivery port 332 is closed by the pump piston 308, supplied with substantially the same scavenging pressure. When the first scavenging ports 128A are opened, air is blown therethrough into the power cylinder and forms a relatively thin air layer adjacent to the layer of exhaust gases. Then, as the second scavenging ports 128B are opened, fume is blown therethrough. The air blown from the first scavenging ports 128A and the fume blown from the second scavenging ports 128B form, as a whole, a moderately swirling layer in the power cylinder while only slightly mixing with each other, said layer gradually increasing its axial thickness so as to urge the layer of exhaust gases toward the exhaust ports 130. Then, after this initial stage of scavenging has been finished and after the first delivery port 332 has been closed by the pump piston 308, the air delivered from the pump 300 is all supplied to the second scavenging ports 128B through the passage 154. Therefore, in this second stage of scavenging, due to further increase of the pressure in the pump cylinder and due to reduction of the opening area of the scavenging ports, the scavenging air is blown into the power cylinder throught the second scavenging ports 128B at increased velocity so as to generate strong swirl flows and turbulence of the air in the power cylinder. Since the reciprocating speed of the pump piston is higher as the rotational speed of the engine increases, stronger swirl flows are generated in the power cylinder as the rotational speed of the engine increases. The crank angle diagram with respect to this eighth embodiment is the same as FIG. 5. Also in this embodiment the phase range in which pump BDC should be located, and conditions with regard to the start limit and the end limit for the closing of the first passage are the same as in the preceding embodiments.

Figure 33:
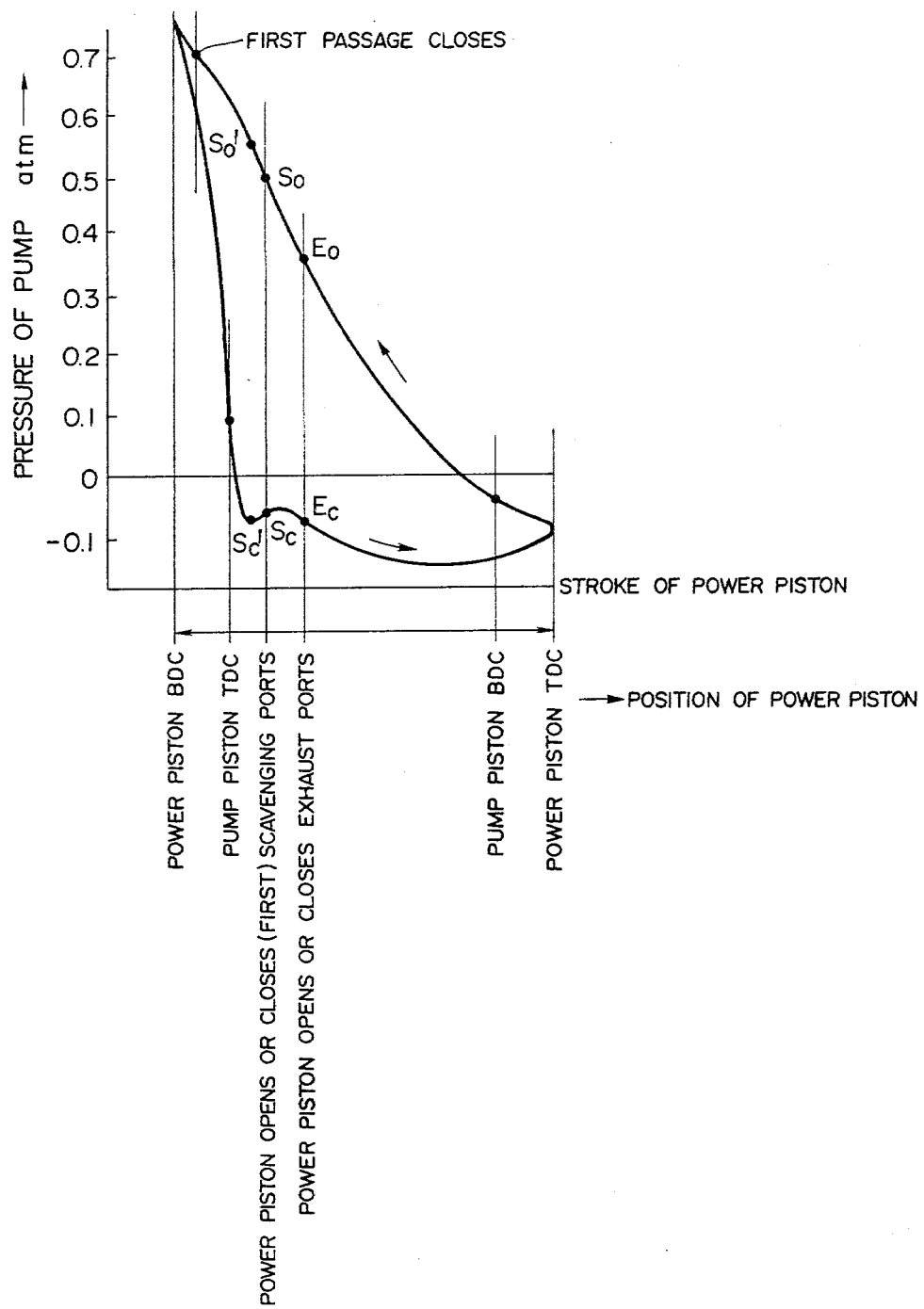
FIG. 33 is an indicator diagram similar to FIG. 6 or 26, showing the pressure of the scavenging pump relative to the position of the power piston in a two-stroke cycle diesel engine of the present invention, in particular in the eighth embodiment shown in FIGS. 30-32.

FIG. 33 is a view similar to FIG. 6, showing the pressure of the scavenging pump relative to the position of the power cylinder in this eighth embodiment. As will be understood by comparing the indicator diagram of FIG. 33 with that of FIG. 6, since the clearance volume is reduced in the structure which incorporates no crankcase compression, a higher pump or scavenging pressure is available, and the pressure can be further increased in the scavenging process after the opening of the scavenging ports, so that it is possible to obtain a sufficiently high scavenging pressure at the first passage closing phase point so as to eject scavenging air at high speed from the second scavenging ports 128B, thereby generating strong swirl flows of air in the power cylinder. In this case the reed valve 160 is not required, and therefore the pressure loss due to the reed valve is avoided and the pump pressure is correspondingly increased.

The pump 300 in this embodiment has substantially the same structure as the pump 300 in the preceding embodiments, except that the pump in this eighth embodiment must have a relatively large stroke volume so as to replace the effect of crankcase compression, which is not incorporated in this embodiment. It has been described that, when crankcase compression is incorporated, the stroke volume of the supplementary scavenging pump should be 0.4–1.1 times as large as the total stroke volume of the power piston. Therefore, if this condition is simply combined with the stroke volume of crankcase compression, the stroke volume of the pump 300 without crankcase compression would be 1.4–2.1 times as large as the total stroke volume of the power piston. However, the volumetric efficiency of the pump becomes higher when compression of scavenging air is performed only by an independent pump without incorporating crankcase compression, and therefore, by taking the same order of acceptable blow-out of scavenging air (0.05–0.25 times as large as the total stroke volume of the power piston) the stroke volume of the pump may be reduced to the order of 1.2–1.9 times as large as the total stroke volume of the power piston. In this case, if the stroke of the pump piston is determined to be substantially the same as that of the power piston, as in the embodiment shown in FIG. 30, the inner diameter of the pump cylinder 302 should be the square root of 1.2 to the square root of 1.9 times as large as the inner diameter of the power cylinder 102. In this case, therefore, the pump pistons 308 and 310 and the connecting rods 312 and 314 will become relatively large. Therefore, two pairs of crank arms 320 and 322 should desirably be employed as crank arms, so that the relatively large moving mass system should be stably guided and so that a better balancing is obtained. The inertia forces of the moving mass system composed of the pistons, crank arms, etc. are internally cancelled by each other when the pump cylinder-piston assembly is constructed so as to have two horizontally opposed pistons, so that the system produces no external force. However, the bearing portions of the crankshafts are heavily stressed. Therefore, it is desirable that the crank arms 320 and 322 should be constructed as pairs of crank arms so that they are securely supported by bearings at their opposite ends. In connection with this, the crankshafts 12 and 14, which operate as a shaft for driving auxiliaries and as an engine output shaft respectively, are extended on the side of the pump 300, the extended portions supporting sprocket wheels 16 and 18 respectively, which are drivingly connected together by an endless chain 20 mounted around them. The crankcase 324 and 326 of the pump 300 are connected with the crankcases 124 and 126 of the power cylinder-piston assembly, respectively, so as to balance fluctuations of the pressure in the crankcases due to reciprocating movement of the pistons 308 and 310. Further, the crankcases 124 and 126 are connected with the air cleaner 90 by way of a positive crankcase ventilation valve (not shown), as in the preceding embodiments.

Figure 34:
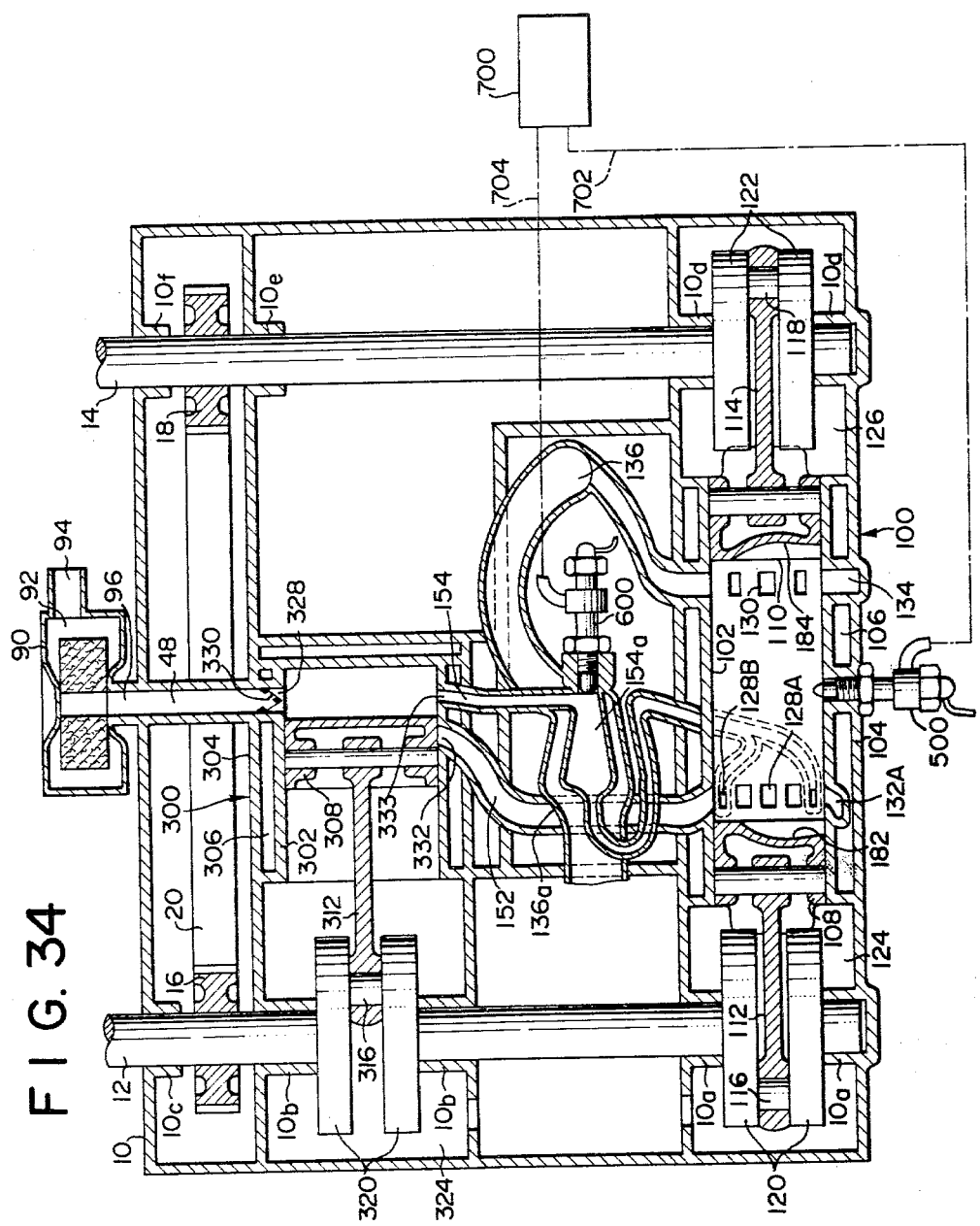
FIG. 34 is a diagrammatical plan sectional view showing a ninth embodiment of the two-stroke cycle diesel engine of the present invention, which is a modification of the embodiment shown in FIG. 30.

FIG. 34 is a view similar to FIG. 30, showing a ninth embodiment of the present invention. In this embodiment the pump 300 is constructed as a single piston reciprocating type pump cylinder-piston assembly, and corresponds to the left half portion of the pump 300 in the embodiment shown in FIG. 30, i.e., the engine corresponds to that shown in FIG. 22 in which the right half portion of the pump assembly 300, i.e., substantially a half of the pump cylinder 302, piston 310, connecting rods 314, crank pin 318, and crank arm 322, has been deleted. In FIG. 34 the portions corresponding to those shown in FIG. 30 are designated by the same reference numerals, and these corresponding portions operate in the same manner in both embodiments. When such a single piston pump assembly is employed, there are disadvantages with regard to the dimensions of the pump piston relative to the power piston and with regard to dynamic balance of the pump assembly when compared with a pump assembly of the horizontally opposed piston type, as described hereinabove. However, in this case the manufacturing cost is reduced, and when the engine is small-sized, the balance and dimensional disadvantages can be sufficiently compensated for by the cost advantage. Since the structure and operation of the other portions of the embodiments shown in FIG. 34 are substantially the same as those of the embodiment shown in FIG. 30, detailed description of these will be omitted in order to avoid duplication.

Although the invention has been shown and described with respect to some preferred embodiments thereof, it should be understood by those skilled in the art that various changes and omissions of the form and detail thereof may be made therein without departing from the scope of the invention.

We claim:

1. A two stroke cycle diesel engine, comprising:
   (a) a two-stroke cycle power cylinder-piston assembly, including:
      (1) a power cylinder having scavenging ports proximate one axial end thereof and exhaust ports proximate the other axial end thereof, said scavenging ports being arranged substantially symmetrically around the central axis of said power cylinder for generating a substantially uniform, cylindrical, uniflow, spiral scavenging flow through said power cylinder;
      (2) first and second horizontally opposed power pistons disposed within said power cylinder;
      (3) first and second crankcases;
      (4) first and second crankarms, a respective one of said crankarms being operatively connected to a respective one of said power pistons and disposed in a respective one of said crankcases; and
      (5) an exhaust pipe in fluid communication with said exhaust ports;
   (b) a scavenging pump device including a reciprocating type pump cylinder-piston assembly separate from and driven by said power cylinder-piston assembly, said pump cylinder-piston assembly including a pump cylinder in fluid communication with said power cylinder and a pump piston disposed within said pump cylinder for reciprocating motion, said scavenging pump device supplying scavenging air for said spiral scavenging flow in said power cylinder; and
   (c) a scavenging air introducing device for introducing scavenging air to said power cylinder, including
      (1) a forced swirl generating device in direct fluid communication with said pump cylinder for receiving compressed air from said pump cylinder-piston assembly and with said power cylinder for generating in said power cylinder a forced swirl of scavenging air rotating about the central axis of said power cylinder, said forced swirl generating device being adapted to provide said forced swirl of scavenging air at a greater force than said spiral scavenging flow during a later stage of scavenging operation; and
      (2) a fuming device in fluid communication with said scavenging air and with a source of fuel for producing fume from part of said scavenging air and part of said fuel to be supplied to said power cylinder, said fuming device being incorporated in said forced swirl generating device and being disposed within said exhaust pipe, the exhaust gases flowing in said exhaust pipe heating said fuming device and said fume produced thereby by heat exchange.

2. The engine of claim 1, wherein said scavenging air introducing device is adapted so as to perform a first stage of operation which scavenges said power cylinder by air, a second stage of operation which scavenges said power cylinder by fume, and a third stage of operation which generates a forced swirl of scavenging air and fume in said power cylinder.

3. The engine of claim 2, wherein said power cylinder includes a first scavenging port which is opened at an early phase point in the scavenging period, and a second scavenging port which is opened at a phase point which is behind the phase point at which said first scavenging port is opened; said scavenging air introducing device includes a first passage system for conducting scavenging air supplied from said savenging pump device to said first scavenging port through one of said crankcases and a second passage system for conducting scavenging air from said scavenging pump device to said second scavenging port; said forced swirl generating device includes an air introducing device which gives swirl to the scavenging air introduced into said power cylinder through said second passage system, and a closer which isolates said first passage system from said pump cylinder-piston assembly at a phase point before said pump cylinder-piston assembly reaches its top dead center; and said fuming device is incorporated in said second passage system; said forced swirl generating device being adapted to generate stronger swirl after said isolation of said first passage system from said pump cylinder-piston assembly.

4. The engine of claim 3, wherein said second scavenging port is so arranged as to be opened at a phase point which is 5°–15° behind the phase point at which said first scavenging port is opened and which is not behind a phase point which is symmetric to the top dead center of said pump cylinder-piston assembly with respect the line which connects the top dead center and the bottom dead center of said power cylinder-piston assembly, as viewed in the crank angle diagram.

5. The engine of claim 3, wherein the bottom dead center of said pump cylinder-piston assembly is, as viewed in the crank angle diagram, between 70°–90° in advance of the phase point at which said first scavenging port is opened, and the phase point at which said first passage system is isolated from said pump cylinder-piston assembly is, as viewed in the crank angle diagram, between the first scavenging port opening phase point and a phase point at which said pump cylinder-piston assembly has ¼ of its total stroke remaining before its top dead center.

6. The engine of claim 3, wherein said closer comprises said pump piston and a delivery port formed in the wall of said pump cylinder of said pump cylinder-piston assembly at a position which is traversed by said pump piston before said pump cylinder-piston assembly reaches its top dead center, said delivery port supplying scavenging air to said first passage system.

7. The engine of claim 3, wherein the ratio of the opening area of said second scavenging port to that of said first scavenging port is approximately ⅓.

8. The engine of claim 3, wherein the amount of the fuel supplied to said fuming device is 8–20% of the total amount of the fuel supplied to the power cylinder-piston assembly, and the amount of the air which forms fume with the fuel for fuming is 10–25% of the total amount of the air supplied to said power cylinder-piston assembly.

9. The engine of claim 3, wherein said fuming device comprises a fume generating chamber through which the scavenging air conducted through said second passage system is passed, and a fuming fuel injection nozzle which injects fuel into said fume generating chamber at a rate which produces fume of fuel density too low to pre-ignite.

10. The engine of claim 9, wherein said fume generating chamber is a cone-shaped chamber having an air inlet at its tip portion and a fume outlet at its dilated bottom portion, said fuming fuel injection nozzle being provided at the tip portion of said cone-shaped chamber.

11. The engine of claim 9, wherein said power cylinder includes a main fuel injection nozzle, said engine further including a jerk type fuel injection pump and a fuel cutoff valve, said main fuel injection nozzle being directly connected with said fuel injection pump, whereas said fuming fuel injection nozzle is connected with said fuel injection pump through said fuel cutoff valve, said main and fuming fuel injection nozzles each being an automatic injection valve which initiates injection of fuel at a predetermined critical injection pressure, the critical injection pressure of said fuming fuel injection nozzle being substantially lower than that of said main fuel injection nozzle, said fuel injection pump comprising a pump plunger and a cam which drives said pump plunger, said cam including a first lobe portion which drives said pump plunger for an amount which is necessary and sufficient to let a predetermined amount of fuel be ejected from said fuming fuel injection nozzle in advance of the bottom dead center of said power cylinder-piston assembly, and a second lobe portion which drives said pump plunger for an amount which is necessary and sufficient to let a predetermined amount of fuel be ejected from said main fuel injection nozzle in advance of the top dead center of said power cylinder-piston assembly, said cutoff valve comprising a valve element, and a cam which drives said valve element towards its valve opening position in synchronization with the operation of said fuel injection pump, said valve element being adapted to be mechanically opened by said cam so as to pass the fuel therethrough, but not to be opened by the pressure of fuel generated by said second lobe portion so as to prevent flow of fuel therethrough.

12. The engine of any one of claims 3–11, wherein said scavenging pump device includes a reciprocating pump structure available from the crankcases of said power cylinder-piston assembly, at least one of said crankcases being connected with said first passage system, the top dead center of said pump cylinder-piston assembly being behind the bottom dead center of said power cylinder-piston assembly.

13. The engine of claim 12, wherein said first passage system includes passages which connect said pump cylinder-piston assembly to said crankcases and passages which connect said crankcases to said first scavenging port.

14. The engine of claim 12, wherein said closer includes a valve port which opens in the wall of one of said crankcases, and a valve element which is supported by one of said crank arms and is adapted to open and close said valve port in accordance with the rotation of said one crank arm.

15. The engine of claim 12, wherein the total stroke volume of said scavenging pump device is 1.4–2.1 times as large as the total stroke volume of the power cylinder-piston assembly.

16. The engine of claim 12, wherein said first passage system includes a first branch passage which supplies air compressed by said pump cylinder-piston assembly and one of said crankcases to said power cylinder-piston assembly and a second branch passage which supplies air compressed by the other of said crankcases to said power cylinder-piston assembly.

17. The engine of claim 16, wherein the power cylinder further comprises a third scavenging port which is opened at a phase point which is behind the phase point at which said second scavenging port is opened, said first branch passage being connected to said first scavenging port, while said second branch passage is connected to said third scavenging port.

18. The engine of claim 16, wherein said first branch passage is directly connected to said first scavenging port, while said second branch passage is connected to said first scavenging passage at a portion thereof which is close to said first scavenging port, with an acute angle being formed between the two branch passages at their upstream side.

19. The engine of any one of claims 2–9, 11, 12 or 1, wherein said scavenging pump device includes a reciprocating pump structure available from the crankcases of said power cylinder-piston assembly, and the top dead center of said pump cylinder-piston assembly is behind the bottom dead center of said power cylinder-piston assembly.

20. The engine of any of claims 2–11 or 1, wherein said scavenging pump device is independent of said crankcases as a part thereof, and the total stroke volume of said scavenging pump device is 1.2–1.9 times as large as the total stroke volume of the power cylinder-piston assembly.

21. The engine of any one of claims 2–11 or 1, wherein the engine comprises two power cylinder-piston assemblies which operate with a phase difference of 180° therebetween and one double-acting pump cylinder-piston assembly.

22. The engine of any one of claims 2–11 or 1, wherein said pump cylinder-piston assembly has two horizontally opposed pistons.

* * * * *